(12) United States Patent
Li et al.

(10) Patent No.: US 10,536,247 B2
(45) Date of Patent: Jan. 14, 2020

(54) METHOD AND APPARATUS FOR CALIBRATION OF AN ANTENNA

(71) Applicant: China Academy of Telecommunications Technology, Beijing (CN)

(72) Inventors: Chuanjun Li, Beijing (CN); Xin Su, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 162 days.

(21) Appl. No.: 15/550,326

(22) PCT Filed: Jan. 8, 2016

(86) PCT No.: PCT/CN2016/070497
§ 371 (c)(1),
(2) Date: Aug. 10, 2017

(87) PCT Pub. No.: WO2016/127748
PCT Pub. Date: Aug. 18, 2016

(65) Prior Publication Data
US 2018/0026766 A1    Jan. 25, 2018

(30) Foreign Application Priority Data

Feb. 11, 2015  (CN) .......................... 2015 1 0073800

(51) Int. Cl.
*H04L 5/00* (2006.01)
*H04L 25/02* (2006.01)
*H04B 17/11* (2015.01)

(52) U.S. Cl.
CPC .......... *H04L 5/0048* (2013.01); *H04L 5/0023* (2013.01); *H04L 25/0204* (2013.01); *H04L 25/0228* (2013.01); *H04B 17/11* (2015.01)

(58) Field of Classification Search
CPC .. H04B 7/0413; H04B 7/0417; H04B 7/0456; H04B 17/21; H04B 17/102;
(Continued)

(56) References Cited

U.S. PATENT DOCUMENTS

2016/0142094 A1*  5/2016  Papadopoulos ........ H04B 17/14
                                                375/219
2017/0084995 A1*  3/2017  Yang ..................... H01Q 3/267

FOREIGN PATENT DOCUMENTS

CN   101854323 A   10/2010
CN   102014094 A    4/2011
(Continued)

*Primary Examiner* — Jae Y Lee
*Assistant Examiner* — Aixa A Guadalupe Cruz
(74) *Attorney, Agent, or Firm* — Foley & Lardner LLP

(57) ABSTRACT

An antenna calibration method and apparatus are used for improving calibration accuracy. In the embodiments of the present invention, sending direction radio frequency channels in an antenna array are grouped into M groups, an intra-group sending calibration pilot frequency sequence of each group of sending direction radio frequency channel is sent at different sending time slots in a time division manner, and along with the decreasing of the quantity of each group of sending direction radio frequency channels, a length of the intra-group sending calibration pilot frequency sequence mapped on each radio frequency channel used for channel estimation is increased, thereby improving the accuracy of an inter-channel compensation factor of each determined sending direction radio frequency channel.

20 Claims, 7 Drawing Sheets

(58) Field of Classification Search
CPC ...... H04B 7/0452; H04B 7/04; H04B 17/318;
H04B 7/024; H04B 7/0634; H04B 17/11;
H04B 1/40; H04B 7/0617; H04W 72/04;
H04W 72/0453; H04W 72/044; H04W
16/28; H04L 5/0007; H04L 5/0048; H04L
25/0228; H04L 5/0023
See application file for complete search history.

(56) References Cited

FOREIGN PATENT DOCUMENTS

| | | |
|---|---|---|
| CN | 102386953 A | 3/2012 |
| EP | 2416507 A1 | 2/2012 |
| WO | WO2014/032271 | 3/2014 |

\* cited by examiner

METHOD AND APPARATUS FOR CALIBRATION OF AN ANTENNA

This application is a US National Stage of International Application No. PCT/CN2016/070497, filed Jan. 8, 2016, designating the United States, and claiming the benefit of Chinese Patent Application No. 201510073800.0, filed with the Chinese Patent Office on Feb. 11, 2015 and entitled "A method and apparatus for calibrating an antenna", each of which is hereby incorporated by reference in its entirety.

FIELD

Embodiments of the present invention relate to the field of communications, and particularly to a method and apparatus for calibrating an antenna.

BACKGROUND

The technologies of intelligent antennas have brought significant advantages to our mobile communication systems, for example, intelligent antennas can be used with the technologies to process a baseband digital signal to perform joint detection, and other operations. Since the characteristics of various elements and devices, and particularly active devices, used in a system including the intelligent antennas are very sensitive to their operating frequencies, ambient temperature, etc., and the characteristic of each link differently varies due to those reasons, so the antennas need to be calibrated periodically in a real network.

Antenna calibration includes transmission calibration and reception calibration. Transmission calibration is performed on radio frequency channels of the antennas in the prior art typically through Frequency Division Multiplexing (FDM), where transmission calibration pilot sequences are mapped into the frequency domains of the respective radio frequency channels. If there is such an array of antennas that is an array of intelligent antennas at a large scale, then there will be a smaller number of transmission calibration pilot sequences mapped onto the respective radio frequency channels, thus resulting in less precise channel information of the respective radio frequency channels obtained as a result of channel estimation using the transmission calibration pilot sequences mapped onto the respective radio frequency channels.

By way of an example, if there is a Long Term Evolution (LTE) system including radio frequency channels, each of which has a bandwidth of 20 MHz, and $N_{sc}$=1200 sub-carriers, each of which has a bandwidth of 15 kHz for example, then if there is an array of intelligent antennas including radio frequency channels of 512 antennas, then frequency-division mapping will be performed by mapping transmission calibration pilot sequences differently into the different frequency domains of the respective radio frequency channels so that the spacing $\Delta d$ between every two adjacent transmission calibration pilot sequences on the respective radio frequency channels will suffice the total number of radio frequency channels or more. Accordingly at this time, the number of transmission calibration pilot sequences which can be mapped onto the respective radio frequency channels is only $M_{sc}^{AC}=\lfloor 1200/512 \rfloor=2$, that is, channel estimation on each radio frequency channel can be performed using only two transmission calibration pilot sequences in the 20 MHz operating bandwidth of the radio frequency channel.

In summary, it is highly desirable to provide a method and apparatus for calibrating an antenna so as to improve the precision of transmission calibration.

SUMMARY

Embodiments of the invention provide a method and apparatus for calibrating an antenna so as to improve the precision of transmission calibration.

An embodiment of the invention provides a method for calibrating an antenna, the method including the steps of:
  obtaining information about grouping of transmitting radio frequency channels, wherein the transmitting radio frequency channels in an array of antennas are grouped into M groups, and M is an integer more than 1;
  transmitting intra-group transmission calibration pilot sequences corresponding respectively to the respective groups of transmitting radio frequency channels over the corresponding groups of transmitting radio frequency channels respectively in transmission timeslots of the intra-group transmission calibration pilot sequences, and performing channel estimation on the respective groups of transmitting radio frequency channels according to feedback signals of the intra-group transmission calibration pilot sequences received over a calibration receiving channel to obtain channel information of the M groups of transmitting radio frequency channels, wherein there are different transmission timeslots of intra-group transmission calibration pilot sequences corresponding to different groups; and
  determining inter-channel compensation coefficients of the respective transmitting radio frequency channels according to the channel information of the M groups of transmitting radio frequency channels.

In an implementation, each group of transmitting radio frequency channels includes N transmitting radio frequency channels, wherein:
  N is 1; or
  N is an integer more than 1, and intra-group transmission calibration pilot sequences are transmitted over different frequency resources in respective transmitting radio frequency channels in a group.

In an implementation, the determining the inter-channel compensation coefficients of the respective transmitting radio frequency channels according to the channel information of the M groups of transmitting radio frequency channels includes:
  selecting a reference channel from each group of transmitting radio frequency channels respectively according to the channel information of each group of transmitting radio frequency channels to obtain M reference channels;
  transmitting inter-group transmission calibration pilot sequences over the M reference channels, and performing channel estimation on the M reference channels according to feedback signals of the inter-group transmission calibration pilot sequences received over the calibration receiving channel to obtain channel information of the M reference channels;
  revising the channel information of the group of transmitting radio frequency channels corresponding to each reference channel respectively according to the channel information of each reference channel; and
  determining the inter-channel compensation coefficient of each transmitting radio frequency channel according to the revised channel information of each group of transmitting radio frequency channels.

In an implementation, the selecting a reference channel from each group of transmitting radio frequency channels respectively according to the channel information of each group of transmitting radio frequency channels includes:

for each group of transmitting radio frequency channels, determining receive power of each transmitting radio frequency channel in the group of transmitting radio frequency channels; and determining transmitting radio frequency channels with their receive power being not below a first threshold as active transmitting radio frequency channels, and selecting a reference channel from all the active transmitting radio frequency channels in the group of transmitting radio frequency channels according to the receive power of all the active transmitting radio frequency channels in the group of transmitting radio frequency channels.

In an implementation, the transmitting the inter-group transmission calibration pilot sequences over the M reference channels includes:

mapping the inter-group transmission calibration pilot sequences onto the sub-carriers in the entire operating bandwidth of each reference channel, wherein the spacing between sub-carriers to which each reference channel is mapped is a first sub-carrier offset more than or equal to M, and the spacing between sub-carriers to which two adjacent reference channels are mapped is a second sub-carrier offset less than the first sub-carrier offset.

In an implementation, the transmitting the inter-group transmission calibration pilot sequences over the M reference channels includes:

transmitting the inter-group transmission calibration pilot sequences over the M reference channels in a transmission timeslot of the inter-group transmission calibration pilot sequences in the current calibration period, wherein the inter-group transmission calibration pilot sequences are transmitted over different frequency resources of the M reference channels.

In an implementation, the performing channel estimation on the M reference channels according to the feedback signals of the inter-group transmission calibration pilot sequences received over the calibration receiving channel includes:

performing channel estimation on the M reference channels according to the feedback signals of the inter-group transmission calibration pilot sequences received over the calibration receiving channel, to obtain channel information corresponding to the sub-carriers to which the inter-group transmission calibration pilot sequences are mapped over each reference channel; and performing interpolation according to the channel information corresponding to the sub-carriers to which the inter-group transmission calibration pilot sequences are mapped over each reference channel, to obtain channel information corresponding to all the sub-carriers over each reference channel.

In an implementation, the revising the channel information of the group of transmitting radio frequency channels corresponding to each reference channel respectively according to the channel information of each reference channel includes:

for each group of transmitting radio frequency channels, calculating a ratio of channel information obtained based upon the inter-group transmission calibration pilot sequences, to channel information based upon the intra-group transmission calibration pilot sequences, of the reference channel of the group of transmitting radio frequency channels as a revision coefficient corresponding to the group of transmitting radio frequency channels; and calculating a product of the revision coefficient corresponding to the group of transmitting radio frequency channels, and the channel information of each transmitting radio frequency channel in the group of transmitting radio frequency channels obtained based upon the intra-group transmission calibration pilot sequences as revised channel information of each transmitting radio frequency channel in the group of transmitting radio frequency channels.

In an implementation, the performing channel estimation on the respective groups of transmitting radio frequency channels according to the feedback signals of the intra-group transmission calibration pilot sequences received over the calibration receiving channel to obtain the channel information of the M groups of transmitting radio frequency channels includes:

performing channel estimation on each group of transmitting radio frequency channels according to the feedback signals of the intra-group transmission calibration pilot sequences received over the calibration receiving channel, to obtain channel information corresponding to the sub-carriers to which the intra-group transmission calibration pilot sequences are mapped over each group of transmitting radio frequency channels; and performing interpolation according to the channel information corresponding to the sub-carriers to which the intra-group transmission calibration pilot sequences are mapped over each group of transmitting radio frequency channels, to obtain channel information corresponding to all the sub-carriers over each group of transmitting radio frequency channels.

In an implementation, the transmitting the intra-group transmission calibration pilot sequences over the corresponding groups of transmitting radio frequency channels includes:

mapping the intra-group transmission calibration pilot sequences corresponding respectively to the respective groups of transmitting radio frequency channels onto the sub-carriers in the entire operating bandwidth of the transmitting radio frequency channels, wherein the spacing between the sub-carriers to which the respective transmitting radio frequency channels are mapped is a third sub-carrier offset which is more than or equal to the number of channels in a group of transmitting radio frequency channels, and the spacing between sub-carriers to which two adjacent transmitting radio frequency channels are mapped is a fourth sub-carrier offset which is less than the third sub-carrier offset.

In an implementation, the transmission timeslots are guard timeslots; and a first transmission timeslot in which the intra-group transmission calibration pilot sequences are transmitted in a first group of transmitting radio frequency channels, and a second transmission timeslot in which the intra-group transmission calibration pilot sequences are transmitted in a second group of transmitting radio frequency channels are two adjacent guard timeslots, or the first transmission timeslot is spaced from the second transmission timeslot by X guard timeslots, wherein the first group of transmitting radio frequency channels, and the second group of transmitting radio frequency channels are any two groups of transmitting radio frequency channels with adjacent transmission timeslots of their intra-group transmission calibration pilot sequences, and X is an integer more than or equal to 1.

In the technical solutions according to the embodiments of the invention, the transmitting radio frequency channels in the array of antennas are grouped, and for each group of transmitting radio frequency channels, intra-group transmission calibration pilot sequences are transmitted only in a transmission timeslot corresponding to the group, that is, intra-group transmission calibration pilot sequences are transmitted in a transmission timeslot over only one group of transmitting radio frequency channels; and as compared with transmission calibration pilot sequences being transmitted in a timeslot over all the transmitting radio frequency channels in the array of antennas, the number of radio frequency channels over which calibration pilot sequences are transmitted in a timeslot can be reduced, so that the length of an intra-group transmission calibration pilot sequence mapped onto each transmitting radio frequency channel in channel estimation can be increased to thereby improve the precision of the determined inter-channel compensation coefficients of the respective transmitting radio frequency channels.

An embodiment of the invention provides an apparatus for calibrating an antenna, the apparatus including:

an obtaining unit configured to obtain information about grouping of transmitting radio frequency channels, wherein the transmitting radio frequency channels in an array of antennas are grouped into M groups, and M is an integer more than 1;

a first processing unit configured to transmit intra-group transmission calibration pilot sequences corresponding respectively to the respective groups of transmitting radio frequency channels over the corresponding groups of transmitting radio frequency channels respectively in transmission timeslots of the intra-group transmission calibration pilot sequences, and to perform channel estimation on the respective groups of transmitting radio frequency channels according to feedback signals of the intra-group transmission calibration pilot sequences received over a calibration receiving channel to obtain channel information of the M groups of transmitting radio frequency channels, wherein there are different transmission timeslots of intra-group transmission calibration pilot sequences corresponding to different groups; and a first determining unit configured to determine inter-channel compensation coefficients of the respective transmitting radio frequency channels according to the channel information of the M groups of transmitting radio frequency channels.

In an implementation, each group of transmitting radio frequency channels includes N transmitting radio frequency channels, wherein:

N is 1; or

N is an integer more than 1, and intra-group transmission calibration pilot sequences are transmitted over different frequency resources in respective transmitting radio frequency channels in a group.

In an implementation, the first determining unit includes:

a selecting unit configured to select a reference channel from each group of transmitting radio frequency channels respectively according to the channel information of each group of transmitting radio frequency channels to obtain M reference channels;

a second processing unit configured to transmit inter-group transmission calibration pilot sequences over the M reference channels, and to perform channel estimation on the M reference channels according to feedback signals of the inter-group transmission calibration pilot sequences received over the calibration receiving channel to obtain channel information of the M reference channels; and a second determining unit configured to revise the channel information of the group of transmitting radio frequency channels corresponding to each reference channel respectively according to the channel information of each reference channel; and to determine the inter-channel compensation coefficient of each transmitting radio frequency channel according to the revised channel information of each group of transmitting radio frequency channels.

In an implementation, the selecting unit is configured:

for each group of transmitting radio frequency channels,
to determine receive power of each transmitting radio frequency channel in the group of transmitting radio frequency channels; and
to determine transmitting radio frequency channels with their receive power being not below a first threshold as active transmitting radio frequency channels, and to select a reference channel from all the active transmitting radio frequency channels in the group of transmitting radio frequency channels according to the receive power of all the active transmitting radio frequency channels in the group of transmitting radio frequency channels.

In an implementation, the second processing unit is further configured:

to map the inter-group transmission calibration pilot sequences onto the sub-carriers in the entire operating bandwidth of each reference channel, wherein the spacing between sub-carriers to which each reference channel is mapped is a first sub-carrier offset more than or equal to M, and the spacing between sub-carriers to which two adjacent reference channels are mapped is a second sub-carrier offset less than the first sub-carrier offset.

In an implementation, the second processing unit is further configured:

to transmit the inter-group transmission calibration pilot sequences over the M reference channels in a transmission timeslot of the inter-group transmission calibration pilot sequences in the current calibration period, wherein the inter-group transmission calibration pilot sequences are transmitted over different frequency resources of the M reference channels.

In an implementation, the second processing unit is further configured:

to perform channel estimation on the M reference channels according to the feedback signals of the inter-group transmission calibration pilot sequences received over the calibration receiving channel, to obtain channel information corresponding to the sub-carriers to which the inter-group transmission calibration pilot sequences are mapped over each reference channel; and
to perform interpolation according to the channel information corresponding to the sub-carriers to which the inter-group transmission calibration pilot sequences are mapped over each reference channel, to obtain channel information corresponding to all the sub-carriers over each reference channel.

In an implementation, the second processing unit is further configured:

for each group of transmitting radio frequency channels,
to calculate a ratio of channel information obtained based upon the inter-group transmission calibration pilot sequences, to channel information based upon the intra-group transmission calibration pilot sequences, of the reference channel of the group of transmitting radio frequency channels as a revision coefficient corresponding to the group of transmitting radio frequency channels; and to calculate a product of the revision coefficient corresponding to the group of transmitting radio frequency channels, and the channel information of each transmitting radio frequency channel in the group of transmitting radio frequency channels obtained based upon the intra-group transmission calibration pilot sequences as revised channel information of each transmitting radio frequency channel in the group of transmitting radio frequency channels.

In an implementation, the second processing unit is further configured:

to perform channel estimation on each group of transmitting radio frequency channels according to the feedback signals of the intra-group transmission calibration pilot sequences received over the calibration receiving channel, to obtain channel information corresponding to the sub-carriers to which the intra-group transmission calibration pilot sequences are mapped over each group of transmitting radio frequency channels; and to perform interpolation according to the channel information corresponding to the sub-carriers to which the intra-group transmission calibration pilot sequences are mapped over each group of transmitting radio frequency channels, to obtain channel information corresponding to all the sub-carriers over each group of transmitting radio frequency channels.

In an implementation, the first processing unit is configured:

to map the intra-group transmission calibration pilot sequences corresponding respectively to the respective groups of transmitting radio frequency channels onto the sub-carriers in the entire operating bandwidth of the transmitting radio frequency channels, wherein the spacing between the sub-carriers to which the respective transmitting radio frequency channels are mapped is a third sub-carrier offset which is more than or equal to the number of channels in a group of transmitting radio frequency channels, and the spacing between sub-carriers to which two adjacent transmitting radio frequency channels are mapped is a fourth sub-carrier offset which is less than the third sub-carrier offset.

In an implementation, the transmission timeslots are guard timeslots; and a first transmission timeslot in which the intra-group transmission calibration pilot sequences are transmitted in a first group of transmitting radio frequency channels, and a second transmission timeslot in which the intra-group transmission calibration pilot sequences are transmitted in a second group of transmitting radio frequency channels are two adjacent guard timeslots, or the first transmission timeslot is spaced from the second transmission timeslot by X guard timeslots, wherein the first group of transmitting radio frequency channels, and the second group of transmitting radio frequency channels are any two groups of transmitting radio frequency channels with adjacent transmission timeslots of their intra-group transmission calibration pilot sequences, and X is an integer more than or equal to 1.

In the technical solutions according to the embodiments of the invention, the transmitting radio frequency channels in the array of antenna are grouped into M groups, and transmission calibration is performed in such a way that the intra-group transmission calibration pilot sequences of the corresponding groups are transmitted over the transmitting radio frequency channels in the corresponding groups respectively in the transmission timeslots corresponding respectively to the respective groups of transmitting radio frequency channels, channel estimation is performed on each group of transmitting radio frequency channels according to the feedback signals of the intra-group transmission calibration pilot sequences received over the calibration receiving channel, to obtain the channel information of the M groups of transmitting radio frequency channels, where the transmission timeslots of the intra-group transmission calibration pilot sequences corresponding to the different groups are different from each other; and the inter-channel compensation coefficient of each transmitting radio frequency channel is determined according to the channel information of the M groups of transmitting radio frequency channels. The transmitting radio frequency channels in the array of antennas are grouped, and for each group of transmitting radio frequency channels, intra-group transmission calibration pilot sequences are transmitted only in a transmission timeslot corresponding to the group, that is, intra-group transmission calibration pilot sequences are transmitted in a transmission timeslot over only one group of transmitting radio frequency channels, so as compared with transmission calibration pilot sequences being transmitted in a timeslot over all the transmitting radio frequency channels in the array of antennas, the number of radio frequency channels over which calibration pilot sequences are transmitted in a timeslot can be reduced, so that the length of an intra-group transmission calibration pilot sequence mapped onto each transmitting radio frequency channel in channel estimation can be increased to thereby improve the precision of the determined inter-channel compensation coefficients of the respective transmitting radio frequency channels.

BRIEF DESCRIPTION OF THE DRAWINGS

In order to make the technical solutions in the embodiments of the invention more apparent, the drawings to be used in a description of the embodiments will be briefly introduced below, and apparently the drawings to be described below are merely illustrative of some embodiments of the invention, and those ordinarily skilled in the art can further derive from these drawings other drawings without any inventive effort. In the drawings.

DETAILED DESCRIPTION OF THE EMBODIMENTS

Figure 1:
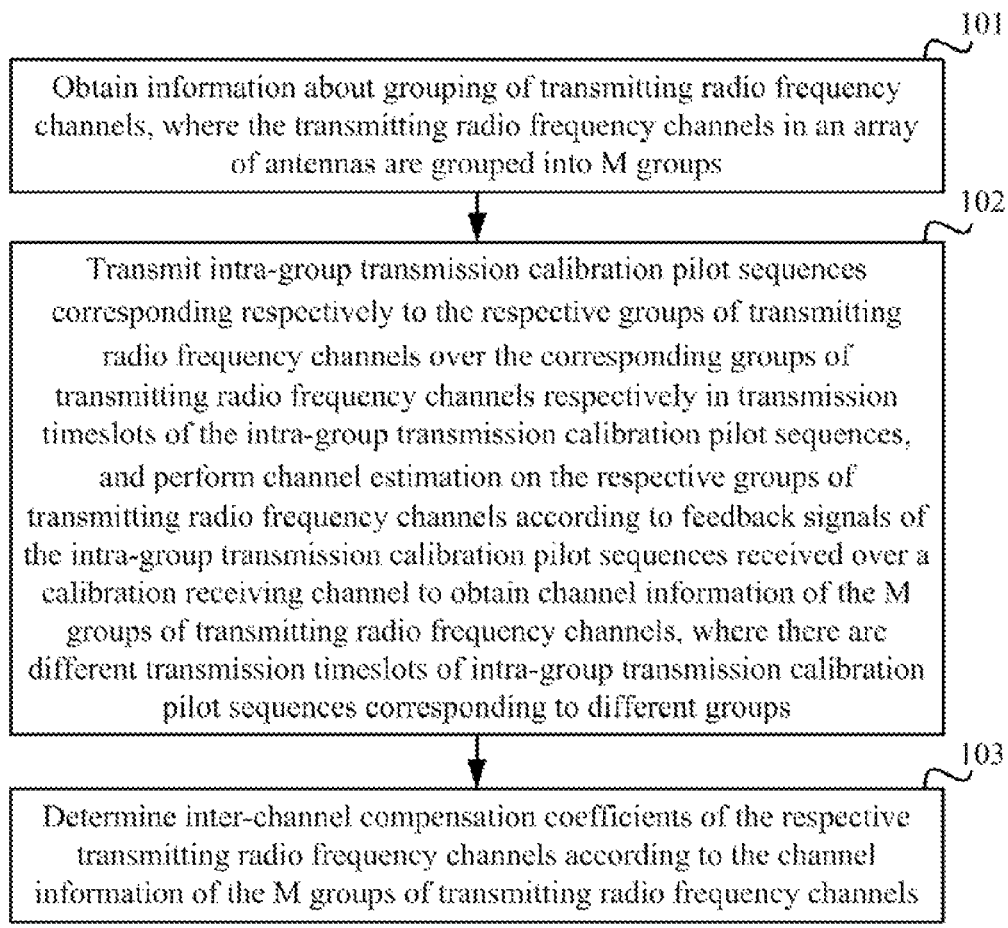
FIG. 1 is a schematic flow chart of a method for calibrating an antenna according to an embodiment of the invention.

In order to make the objects, technical solutions, and advantageous effects of the invention more apparent, the invention will be described below in further details with reference to the drawings, and the embodiments thereof. It shall be appreciated that the particular embodiments described here are merely intended to explain but not to limit the invention.

The embodiments of the invention are applicable to transmission calibration on an antenna. The embodiments of the invention are applicable to a system including a number of antennas. Typically there is a transmitting radio frequency channel of each antenna element, and the embodiments of the invention will not be limited to any particular number of transmitting radio frequency channels for an antenna element.

In the embodiments of the invention, transmitting radio frequency channels in an array of antennas are grouped into M groups, where M is an integer more than 1. The number of transmitting radio frequency channels in one group may or may not be the same as the number of transmitting radio frequency channels in another group. If there is one transmitting radio frequency channel for one antenna element, for example, then one or more rows of antenna elements may be grouped into one group, or one or more columns of antenna elements may be grouped into one group, but the embodiments of the invention will not be limited to any particular grouping pattern. For example, for an array of antennas including Q antenna elements, transmitting radio frequency channels can be grouped into M groups of transmitting radio frequency channels, where there are N transmitting radio frequency channels in each group of transmitting radio frequency channels, and M×N=Q.

In the embodiments of the invention, the transmission calibration pilot sequences for transmission calibration can include intra-group transmission calibration pilot sequences. Furthermore the transmission calibration pilot sequences for transmission calibration can include inter-group transmission calibration pilot sequences. The intra-group transmission calibration pilot sequences and the inter-group transmission calibration pilot sequences can be used as described below.

The intra-group transmission calibration pilot sequences and the inter-group transmission calibration pilot sequences can be determined in a number of methods in the embodiments of the invention.

A method for determining an intra-group transmission calibration pilot sequence $c^{In}(i)$ according to an embodiment of the invention will be described below in details.

Firstly the intra-group transmission calibration pilot sequences can be Zadoff-Chu (ZC) sequences with good correlation. In a system operating bandwidth, the total number of sub-carriers in the frequency domain over all the transmitting radio frequency channels is determined in Equation (1) of:

$$K = N_{RB} N_{sc}^{RB} \qquad (1)$$

In Equation (1) above:

K represents the total number of sub-carriers in the frequency domain over all the transmitting radio frequency channels; and $N_{RB}$ represents the number of resource blocks in a system operating bandwidth of a single transmitting radio frequency channel, and $N_{sc}^{RB}$ represents the number of sub-carriers in each resource block.

Secondly the length of an intra-group transmission calibration pilot sequence is determined in Equation (2) of:

$$N_{sc}^{In} = \left\lfloor \frac{K}{\Delta d_{sc}^{In}} \right\rfloor \qquad (2)$$

In Equation (2) above:

$N_{sc}^{In}$ represents the length of an intra-group transmission calibration pilot sequence;

K represents the total number of sub-carriers; and $\Delta d_{sc}^{In}$ represents the spacing between sub-carriers to which each transmitting radio frequency channel is mapped, i.e., the interval between two adjacent intra-group transmission calibration pilot sequences in a single transmitting radio frequency channel; and $\lfloor \cdot \rfloor$ represents rounding down.

Particularly if the intra-group transmission calibration pilot sequences are mapped into each group of transmitting radio frequency channels, then the intra-group transmission calibration pilot sequences will be spread throughout the operating bandwidth, for example, the operating bandwidth of each transmitting radio frequency channel can be 20 MHz or 40 MHz; and also the interval between two adjacent intra-group transmission calibration pilot sequences in a single transmitting radio frequency channel will be determined, and in order to ensure the intra-group transmission calibration pilot sequences to be mapped respectively onto different frequency resources of each radio frequency channel in the frequency division mode, the interval between two adjacent intra-group transmission calibration pilot sequences will be more than or equal to N, where N represents the total number of transmitting radio frequency channels in each group of transmitting radio frequency channels.

Lastly the intra-group transmission calibration pilot sequences are determined in Equation (3) of:

$$c^{In}(i) = x_g(w) \qquad (3)$$

In Equation (3) above:

$c^{In}(i)$ represents the i-th intra-group transmission calibration pilot sequence;

Where i represents an index, i is a positive integer, $0 \leq i < N_{sc}^{In}$, and $N_{sc}^{In}$ represents the length of the intra-group transmission calibration pilot sequence;

$$0 \leq w \leq N_{ZC}^{In} - 1, \text{ and } x_g(w) = e^{-j\frac{\pi g w(w+1)}{N_{ZC}^{In}}};$$

and $\lfloor \cdot \rfloor$ represents rounding down;

$N_{ZC}^{In}$ represents the length of a ZC sequence for the intra-group transmission calibration pilot sequence, and $N_{ZC}^{In}$ is the largest prime number satisfying the condition $N_{ZC}^{In} \leq N_{sc}^{In}$;

$$g = \lfloor \bar{g} + \frac{1}{2} \rfloor + v \cdot (-1)^{\lfloor 2\bar{g} \rfloor}$$

$\bar{g} = N_{ZC}^{In} \cdot (u+1)/31$; and u=0
v=0
Furthermore w=(i mod $N_{ZC}^{In}$), and w=(i mod $N_{ZC}^{In}$) is substituted into Equation (3) above, thus resulting in Equation (4):

$$c^{In}(i)=x_q(i \bmod N_{ZC}^{In}) \quad (4)$$

In Equation (4) above, mod represents taking a remainder.

The method above for determining an intra-group transmission calibration pilot sequence will be described below by way of a particular example.

If the operating bandwidth of each transmitting radio frequency channel is 20 MHz, the number of sub-carriers in the frequency domain in the transmitting radio frequency channel in the operating bandwidth is K=1200, and the number of transmitting radio frequency channels in each group of transmitting radio frequency channels is N=8, then $\Delta d_{sc}^{In}=12$ may be set to thereby satisfy $\Delta d_{sc}^{In} \geq N$ as required.

Firstly the length $N_{sc}^{In}$ of an intra-group transmission calibration pilot sequence is determined in Equation (2) above:

$$N_{sc}^{In} = \left\lfloor \frac{K}{\Delta d_{sc}^{In}} \right\rfloor = \left\lfloor \frac{1200}{12} \right\rfloor = 100$$

Next the length $N_{ZC}^{In}$ of a ZC sequence for the intra-group transmission calibration pilot sequence is determined; and $N_{ZC}^{In}$ is the largest prime number satisfying the condition $N_{ZC}^{In} \leq N_{sc}^{In}$, and $N_{sc}^{In}=100$, so the largest prime number satisfying the condition $N_{ZC}^{In} \leq N_{sc}^{In}$ is 99, that is, $N_{ZC}^{In}=99$.

Thereafter all the intra-group transmission calibration pilot sequences in each transmitting radio frequency channel are determined in Equation (3) and Equation (4), and particularly all the intra-group transmission calibration pilot sequences in each transmitting radio frequency channel are $c^{In}(0)$, $c^{In}(1)$, $c^{In}(2)$, ... $c^{In}(i)$ ... $c^{In}(N_{sc}^{In}-1)$ respectively.

A method for determining an inter-group transmission calibration pilot sequence of a reference channel according to an embodiment of the invention will be described below in details.

Firstly a reference channel is a transmitting radio frequency channel selected from each group of transmitting radio frequency channels, so for each reference channel, the number K of sub-carriers in the frequency domain over the transmitting radio frequency channel in a system operating bandwidth is still determined in Equation (1) above.

Secondly the length of the inter-group transmission calibration pilot sequence of the reference channel is determined in Equation (5) of:

$$N_{sc}^{Ref} = \left\lfloor \frac{K}{\Delta d_{sc}^{Ref}} \right\rfloor \quad (2)$$

In Equation (5) above:
$N_{sc}^{Ref}$ represents the length of the inter-group transmission calibration pilot sequence of the reference channel;
K represents the total number of sub-carriers; and
$\Delta d_{sc}^{Ref}$ represents the interval between two adjacent inter-group transmission calibration pilot sequences in a transmitting radio frequency channel of a single reference channel; and $\lfloor \cdot \rfloor$ represents rounding down.

Particularly if the inter-group transmission calibration pilot sequences are mapped onto transmitting radio frequency channels of M reference channels, then the inter-group transmission calibration pilot sequences will be spread throughout the operating bandwidth, for example, the operating bandwidths of transmitting radio frequency channels of each reference channel can be 20 MHz or 40 MHz; and also the interval between two adjacent inter-group transmission calibration pilot sequences in transmitting radio frequency channels of a single reference channel will be determined, and in order to ensure the inter-group transmission calibration pilot sequences to be mapped respectively onto different frequency resources of radio frequency channels of each reference channel in the frequency division mode, the interval between two adjacent inter-group transmission calibration pilot sequences will be more than or equal to M, where M represents the total number of groups of transmitting radio frequency channels.

Lastly the inter-group transmission calibration pilot sequences are determined in Equation (6) of:

$$c^{Ref}(j)=x_l(r) \quad (6)$$

In Equation (6) above:
j represents an index, $0 \leq j < N_{sc}^{Ref}$, and $N_{sc}^{Ref}$ represents the length of an inter-group transmission calibration pilot sequence;
$c^{Ref}(j)$ represents the j-th inter-group transmission calibration pilot sequence corresponding to the reference channel;

$$0 \leq r \leq (N_{ZC}^{Ref}-1), \text{ and } x_l(r) = e^{-j\frac{\pi l r(r+1)}{N_{ZC}^{Ref}}};$$

$N_{ZC}^{Ref}$ represents the length of a ZC sequence for the inter-group transmission calibration pilot sequence, and $N_{ZC}^{Ref}$ is the largest prime number satisfying the condition $N_{ZC}^{Ref} \leq N_{sc}^{Ref}$;

$l=\lfloor \bar{l}+\frac{1}{2} \rfloor + v \cdot (-1)^{\lfloor 2\bar{l} \rfloor}$ $\bar{l}=N_{ZC}^{Ref} \cdot (u+1)/31$; and u=0
v=0

Furthermore r=(j mod $N_{ZC}^{Ref}$), and r=(j mod $N_{ZC}^{Ref}$) is substituted into Equation (6) above, thus resulting in Equation (7):

$$c^{Ref}(j)=x_q(j \bmod N_{ZC}^{Ref}) \quad (7)$$

In Equation (7) above, mod represents taking a remainder.

Particularly all the inter-group transmission calibration pilot sequences in each reference channel are determined in Equation (6) and Equation (7), and particularly all the inter-group transmission calibration pilot sequences in each transmitting radio frequency channel are $c^{Ref}(0)$, $c^{Ref}(1)$, $c^{Ref}(2)$, ... $c^{Ref}(j)$ ... $c^{Ref}(N_{sc}^{In}-1)$ respectively.

In the embodiments of the invention, the intra-group transmission calibration pilot sequences and the inter-group transmission calibration pilot sequences can be determined in a number of implementations without any limitation to the implementations described above. In an implementation, each group of transmitting radio frequency channels corresponds separately to one intra-group transmission calibration pilot sequence, and different groups of transmitting radio frequency channels correspond to different intra-group transmission calibration pilot sequences. Alternatively each group of transmitting radio frequency channels may correspond to the same intra-group transmission calibration pilot sequence. In the embodiments of the invention, the intra-group transmission calibration pilot sequences and the inter-group transmission calibration pilot sequences can be determined at any time as decided by the user. For example, the intra-group transmission calibration pilot sequences may be determined in advance, and after channel estimation is performed on each group of transmitting radio frequency channels, if channel estimation needs to be performed on the reference channels, then the inter-group transmission calibration pilot sequences may be further determined.

FIG. 1 illustrates a method for calibrating an antenna according to an embodiment of the invention, and as illustrated in FIG. 1, the method includes the operations of:

The operation 101 of obtaining information about grouping of transmitting radio frequency channels, where the transmitting radio frequency channels in an array of antennas are grouped into M groups, and M is an integer more than 1;

The operation 102 of transmitting intra-group transmission calibration pilot sequences corresponding respectively to the respective groups of transmitting radio frequency channels over the corresponding groups of transmitting radio frequency channels respectively in transmission timeslots of the intra-group transmission calibration pilot sequences, and performing channel estimation on the respective groups of transmitting radio frequency channels according to feedback signals of the intra-group transmission calibration pilot sequences received over a calibration receiving channel to obtain channel information of the M groups of transmitting radio frequency channels, where there are different transmission timeslots of intra-group transmission calibration pilot sequences corresponding to different groups; and The operation 103 of determining inter-channel compensation coefficients of the respective transmitting radio frequency channels according to the channel information of the M groups of transmitting radio frequency channels.

In an implementation, each group of transmitting radio frequency channels includes N transmitting radio frequency channels, where N is 1, or N is an integer more than 1. If N is an integer more than 1, then intra-group transmission calibration pilot sequences will be transmitted over different frequency resources in respective transmitting radio frequency channels in a group, that is, intra-group transmission calibration pilot sequences will be transmitted in a group in the frequency division mode.

Particularly if N is 1, that is, there is only one transmitting radio frequency channel in a group, then intra-group transmission calibration pilot sequences will be transmitted in respective transmission timeslots over the respective transmitting radio frequency channels in the time division mode over as described in the embodiment above. At this time, the intra-group transmission calibration pilot sequences corresponding to the respective transmitting radio frequency channels can be mapped onto the frequency resources of the transmitting radio frequency channels. In order to improve the accuracy of the obtained channel information, a larger number of intra-group transmission calibration pilot sequences can be mapped onto the frequency resources of the transmitting radio frequency channels, or at most an intra-group transmission calibration pilot sequence can be mapped onto each of the frequency resources of the transmitting radio frequency channels, thus improving the accuracy of channel estimation on the transmitting radio frequency channels.

On the other hand, if N is an integer more than 1, then since each group of transmitting radio frequency channels includes a number of transmitting radio frequency channels, and intra-group transmission calibration pilot sequences corresponding to all the respective transmitting radio frequency channels in the group of transmitting radio frequency channels need to be transmitted in a transmission timeslot, the intra-group transmission calibration pilot sequences corresponding to the group of transmitting radio frequency channels may be mapped onto different frequency resources of the group of transmitting radio frequency channels in the frequency division mode, so that intra-group transmission calibration pilot sequences are transmitted over different frequency resources in respective transmitting radio frequency channels in a group. In another implementation, channel estimation on a number of transmitting radio frequency channels in a group can be performed in the code division mode.

In the embodiments of the invention, the transmitting radio frequency channels in the array of antennas are grouped, and for each group of transmitting radio frequency channels, intra-group transmission calibration pilot sequences are transmitted only in a transmission timeslot corresponding to the group, that is, intra-group transmission calibration pilot sequences are transmitted in a transmission timeslot over only one group of transmitting radio frequency channels; and as compared with transmission calibration pilot sequences being transmitted in a timeslot over all the transmitting radio frequency channels in the array of antennas, the number of radio frequency channels over which calibration pilot sequences are transmitted in a timeslot can be reduced in the embodiments of the invention, so that the length of an intra-group transmission calibration pilot sequence which can be mapped onto each radio frequency channel in a group is increased accordingly. Furthermore the length of an intra-group transmission calibration pilot sequence mapped in channel estimation on each transmitting radio frequency channel can be increased to thereby improve the precision of the inter-channel compensation coefficients of the respective transmitting radio frequency channels determined according to the channel information of the M groups of transmitting radio frequency channels.

In an embodiment of the invention, each group of transmitting radio frequency channels corresponds to an intra-group transmission calibration pilot sequence, and transmission calibration pilot sequences corresponding to different groups may or may not be the same. The intra-group transmission calibration pilot sequence corresponding to each group of transmitting radio frequency channels is used for channel estimation on the group of transmitting radio frequency channels.

In the operation 102, in an implementation, for the intra-group transmission calibration pilot sequences mapped onto the respective groups of transmitting radio frequency channels, the intra-group transmission calibration pilot sequences corresponding respectively to the respective groups of transmitting radio frequency channels are mapped onto the sub-carriers in the entire operating bandwidth of the transmitting radio frequency channels, where the spacing between the sub-carriers to which the respective transmitting radio frequency channels are mapped is a third sub-carrier offset which is more than or equal to the number of channels in a group of transmitting radio frequency channels, and the spacing between sub-carriers to which two adjacent transmitting radio frequency channels are mapped is a fourth sub-carrier offset which is less than the third sub-carrier offset.

Figure 2:
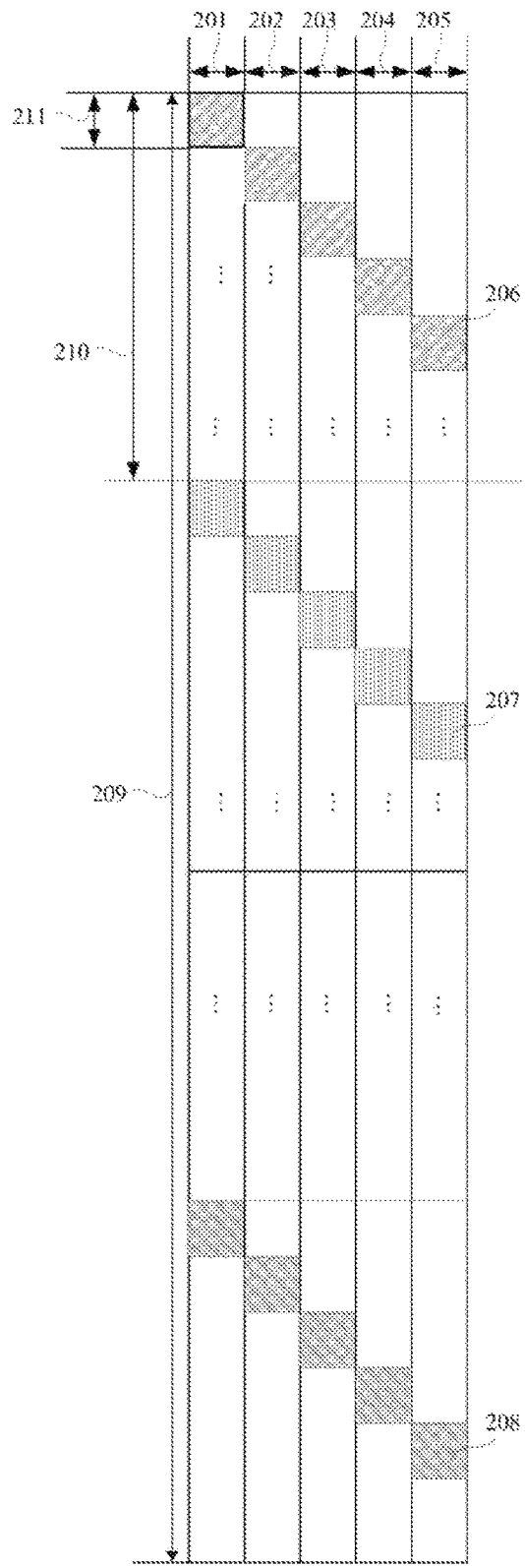
FIG. 2 is a schematic diagram of mapping intra-group transmission calibration pilot sequences onto sub-carriers in the entire operating bandwidth of transmitting radio frequency channels according to an embodiment of the invention.

FIG. 2 is a schematic diagram of mapping intra-group transmission calibration pilot sequences onto sub-carriers in the entire operating bandwidth of transmitting radio frequency channels according to an embodiment of the invention. As illustrated in the schematic diagram of a group of transmitting radio frequency channels, for example, the group of transmitting radio frequency channels includes transmitting radio frequency channels of five antennas, which are a first transmitting radio frequency channel 201, a second transmitting radio frequency channel 202, a third transmitting radio frequency channel 203, a fourth transmitting radio frequency channel 204, and a fifth transmitting radio frequency channel 205, where each transmitting radio frequency channel corresponds to an operating bandwidth 209 including all the sub-carriers in the corresponding transmitting radio frequency channel. The spacing between sub-carriers to which each transmitting radio frequency channel is mapped is a third sub-carrier offset 210.

Particularly in FIG. 2, the spacing between a first intra-group transmission calibration pilot sequence 206 and a second intra-group transmission calibration pilot sequence 207 mapped in the first transmitting radio frequency channel 201 is the third sub-carrier offset 210. The spacing between sub-carriers to which two adjacent transmitting radio frequency channels are mapped is a fourth sub-carrier offset 211. Particularly in FIG. 2, the spacing between the first intra-group transmission calibration pilot sequence 206 in the first transmitting radio frequency channel 201, and the first intra-group transmission calibration pilot sequence 206 in the second transmitting radio frequency channel 202 is the fourth sub-carrier offset 211.

All the intra-group transmission calibration pilot sequences in a group corresponding to each group of transmitting radio frequency channels as determined above are $c^{In}(0), c^{In}(1), c^{In}(2), \ldots c^{In}(j) \ldots c^{In}(N_{sc}^{In}-1)$ respectively, where $c^{In}(i)$ represents the i-th intra-group transmission calibration pilot sequence; and i represents an index, i is a positive integer, $0 \leq i < N_{sc}^{In}$, and $N_{sc}^{In}$ represents the length of an intra-group transmission calibration pilot sequence. All the intra-group transmission calibration pilot sequences are mapped respectively into each transmitting radio frequency channel. As illustrated in FIG. 2, firstly $c^{In}(0)$, i.e., the first intra-group transmission calibration pilot sequence 206, is mapped into each transmitting radio frequency channel, next $c^{In}(1)$ i.e., the second intra-group transmission calibration pilot sequence 207, is mapped into each transmitting radio frequency channel, and the determined intra-group transmission calibration pilot sequences are mapped respectively into each transmitting radio frequency channel sequentially until lastly $c^{In}(N_{sc}^{In}-1)$, i.e., the $(N_{sc}^{In}-1)$-th intra-group transmission calibration pilot sequence, is mapped into each transmitting radio frequency channel.

As can be apparent from FIG. 2, if intra-group transmission calibration pilot sequences corresponding respectively to each group of transmitting radio frequency channels are mapped onto sub-carriers in the entire operating bandwidth in the frequency division mode, then the distance denoted by the third sub-carrier offset 210 in FIG. 2 may be the spacing between sub-carriers to which each transmitting radio frequency channel is mapped. Since an intra-group transmission calibration pilot sequence needs to be mapped onto a different frequency resource in each of the transmitting radio frequency channels in the group of transmitting radio frequency channels in the third sub-carrier offset 210, the spacing between sub-carriers to which each transmitting radio frequency channel is mapped shall be more than or equal to 5 in FIG. 2 so that there is an intra-group transmission calibration pilot sequence mapped onto each of five transmitting radio frequency channels, and each intra-group transmission calibration pilot sequence is mapped onto a different frequency resource, in the spacing of each third sub-carrier offset 210 in the group of transmitting radio frequency channels in FIG. 2.

In an implementation, if the third sub-carrier offset 210 is set larger, then the intra-group transmission calibration pilot sequences mapped into the respective transmitting radio frequency channels may be arranged uniformly in the third sub-carrier offset 210. For example, the fourth sub-carrier offset 211 illustrated in FIG. 2 is the spacing of one sub-carrier. In an implementation, the fourth sub-carrier offset 211 may alternatively be the spacing of more than one sub-carrier, but the embodiments of the invention will not be limited to any particular spacing.

FIG. 2 illustrates a mapping pattern of intra-group transmission calibration pilot sequences in only one group, and there are M groups of transmitting radio frequency channels in total in the embodiments of the invention, but the intra-group transmission calibration pilot sequences in the other groups may or may not be mapped in substantially the same pattern as the pattern in which the intra-group transmission calibration pilot sequences in the group are mapped as illustrated in FIG. 2, and the embodiments of the invention will not be limited thereto.

Furthermore after intra-group transmission calibration pilot sequences corresponding respectively to each group of transmitting radio frequency channels are mapped into the transmitting radio frequency channels in the corresponding group in the frequency division mode, the intra-group transmission calibration pilot sequences corresponding respectively to each group of transmitting radio frequency channels are transmitted respectively in a transmission timeslot of the intra-group transmission calibration pilot sequences.

Figure 3:
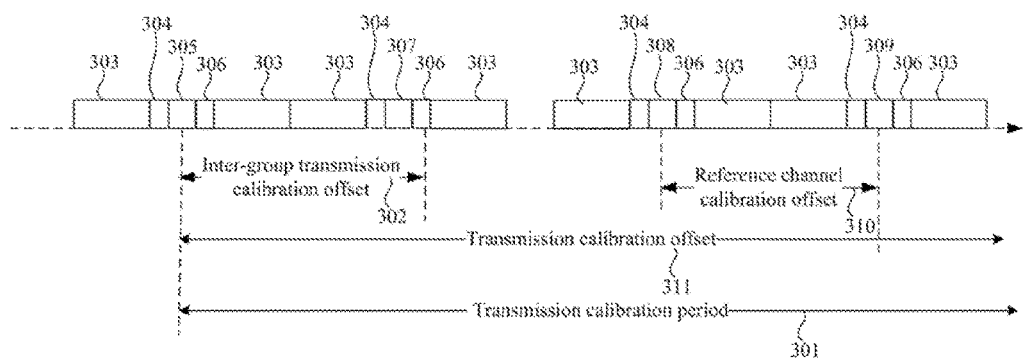
FIG. 3 is a schematic diagram of transmitting each group of transmission calibration pilot sequences in a transmission timeslot according to an embodiment of the invention.

Particularly as illustrated in FIG. 3, FIG. 3 illustrates a schematic diagram of transmitting each group of transmission calibration pilot sequences in a transmission timeslot according to an embodiment of the invention. FIG. 3 illustrates a number of sub-frames 303, and also a number of transmission timeslots, e.g., a first transmission timeslot 305, a second transmission timeslot 307, a third transmission timeslot 308, etc. Intra-group transmission calibration pilot sequences mapped onto at most one group of transmitting radio frequency channels are transmitted in a timeslot. A group of transmission calibration pilot sequences is transmitted in each transmission timeslot for antenna calibration throughout a transmission calibration period 301. In a frame structure, a preceding frame 304 to the transmission timeslot, and a succeeding frame 306 to the transmission timeslot are sub-frames in a special structure. If the transmission timeslot is a guard timeslot, then the preceding frame 304 to the transmission timeslot will be a downlink pilot timeslot, and the succeeding frame 306 to the transmission timeslot will be an uplink pilot timeslot. In FIG. 3, if transmission calibration pilot sequences of a first group of transmitting radio frequency channels are transmitted in the first transmission timeslot 305, transmission calibration pilot sequences of a second group of transmitting radio frequency channels are transmitted in the second transmission timeslot 307, and transmission calibration pilot sequences of the M-th group of transmitting radio frequency channels are transmitted in the third transmission timeslot 308, then the spacing between transmission timeslots corresponding to two adjacent groups of transmitting radio frequency channels will be an inter-group transmission calibration offset 302.

In an implementation, in another transmission scheme, transmission calibration pilot sequences of a first group of transmitting radio frequency channels are transmitted in the first transmission timeslot 305, no transmission calibration pilot sequences of any one group of transmitting radio frequency channels are transmitted in the second transmission timeslot 307, and transmission calibration pilot sequences of each group of transmitting radio frequency channels are transmitted sequentially in the transmission timeslots until transmission calibration pilot sequences of the M-th group of transmitting radio frequency channels are transmitted in the third transmission timeslot 308, that is, transmission timeslots corresponding to every two adjacent groups of transmitting radio frequency channels can be spaced from each other by one or more transmission timeslots. Particularly there are a number of transmission schemes in which the transmission calibration pilot sequences are transmitted in the transmission timeslots as long as intra-group transmission calibration pilot sequences mapped onto at most one group of transmitting radio frequency channels are transmitted in a timeslot.

In an implementation, the transmission timeslots are guard timeslots; and the first transmission timeslot in which the intra-group transmission calibration pilot sequences are transmitted in the first group of transmitting radio frequency channels, and the second transmission timeslot in which the intra-group transmission calibration pilot sequences are transmitted in the second group of transmitting radio frequency channels are two adjacent transmission timeslots, or the first transmission timeslot is spaced from the second transmission timeslot by X guard timeslots, where the first group of transmitting radio frequency channels, and the second group of transmitting radio frequency channels are any two groups of transmitting radio frequency channels with adjacent transmission timeslots of their intra-group transmission calibration pilot sequences, and X is an integer more than or equal to 1. In an implementation, the interval between transmission timeslots of two adjacent groups of transmitting radio frequency channels can be an inter-group transmission calibration offset $\Delta T^{In}$ in an embodiment of the invention.

Figure 4:
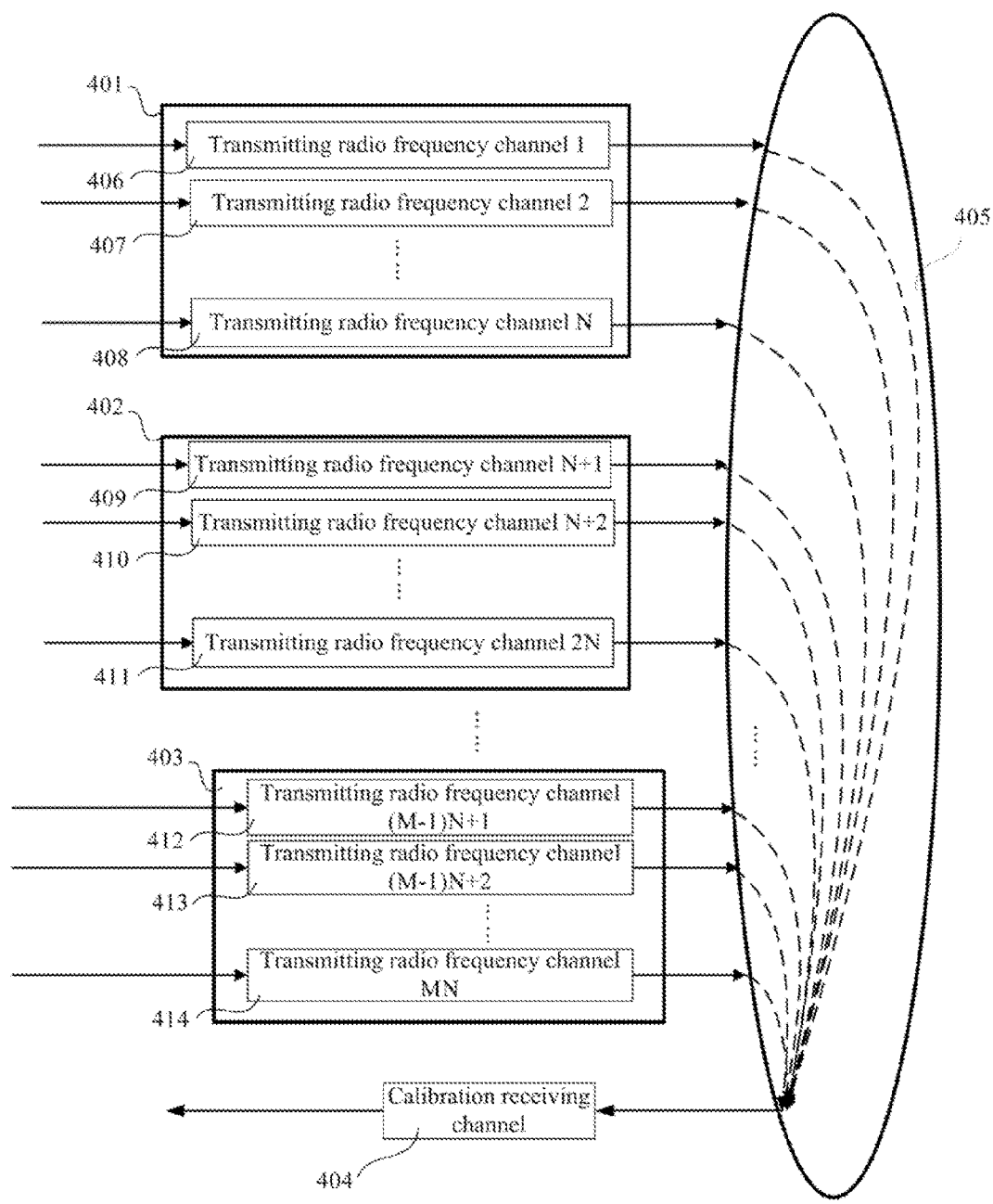
FIG. 4 is a schematic diagram of transmitting radio frequency channels according to an embodiment of the invention.

Furthermore the array of antennas includes a calibration receiving channel in addition to the antennas, each of which corresponds to a transmitting radio frequency channel as illustrated in FIG. 4. FIG. 4 illustrates a schematic diagram of transmitting radio frequency channels according to an embodiment of the invention, and in an embodiment of the invention, for example, there are M groups of transmitting radio frequency channels in total, each of which includes N transmitting radio frequency channels. Then as illustrated in FIG. 4, a first group of transmitting radio frequency channels 401 includes N transmitting radio frequency channels in total, which are a transmitting radio frequency channel 1 (406), a transmitting radio frequency channel 2 (407), . . . , and a transmitting radio frequency channel N (408) respectively; a second group of transmitting radio frequency channels 402 includes N transmitting radio frequency channels in total, which are a transmitting radio frequency channel N+1 (409), a transmitting radio frequency channel N+2 (410), . . . , and a transmitting radio frequency channel 2N (411) respectively; . . . , and the M-th group of transmitting radio frequency channel 403 includes N transmitting radio frequency channels in total, which are a transmitting radio frequency channel (M−1)*N+1 (412), a transmitting radio frequency channel (M−1)*N+2 (413), . . . , and a transmitting radio frequency channel M*N (414) respectively. FIG. 4 further illustrates a coupling network 405 and a calibration receiving channel 404.

As illustrated in FIG. 4, after intra-group transmission calibration pilot sequences corresponding to each group of transmitting radio frequency channels are mapped onto the group of transmitting radio frequency channels, the intra-group transmission calibration pilot sequences are transmitted over the transmitting radio frequency channels in the group in a transmission timeslot, the intra-group transmission calibration pilot sequences transmitted in the N transmitting radio frequency channels in the group are processed over the coupling network 405, and channel estimation is performed on the group of transmitting radio frequency channels according to feedback signals of the intra-group transmission calibration pilot sequences of the group received over the calibration receiving channel 404.

A process of channel estimation on each group of transmitting radio frequency channel will be described below in details taking the first group of transmitting radio frequency channels as an example. Those skilled in the art can appreciate that channel estimation on the other groups of transmitting radio frequency channels will be similar to that on the first group, so a repeated description thereof will be omitted here.

Firstly the intra-group transmission calibration pilot sequences corresponding to the first group of transmitting radio frequency channels are determined as described above. In an embodiment of the invention, for example, each group of transmitting radio frequency channels corresponds to the same intra-group transmission calibration pilot sequences, but those skilled in the art can alternatively select different intra-group transmission calibration pilot sequences respectively for the other groups of transmitting radio frequency channels.

Secondly a pattern in which the intra-group transmission calibration pilot sequences corresponding to the first group of transmitting radio frequency channels are mapped in the first group of transmitting radio frequency channels is determined. In an implementation, the spacing between sub-carriers to which each transmitting radio frequency channel is mapped, and the spacing between sub-carriers to which two adjacent transmitting radio frequency channels are mapped are determined as described above.

Thirdly the intra-group transmission calibration pilot sequences corresponding to the first group of transmitting radio frequency channels are mapped in each transmitting radio frequency channel in the first group of transmitting radio frequency channels at the spacing between sub-carriers to which each transmitting radio frequency channel is mapped, and the spacing between sub-carriers to which two adjacent transmitting radio frequency channels, and transmission signals of N transmitting radio frequency channels are generated in Equation (8) of:

$$s_n^{In}(k) = c^{In}(i) \tag{8}$$

In Equation (8) above:

$s_n^{In}(k)$ represents a transmission signal of the k-th sub-carrier of the n-th transmitting radio frequency channel in each group of transmitting radio frequency channels;

i represents an index, i is a positive integer, $0 \leq i < N_{sc}^{In}$, and $N_{sc}^{In}$ represents the length of an intra-group transmission calibration pilot sequence;

$c^{In}(i)$ represents the i-th intra-group transmission calibration pilot sequence;

n represents the index of each transmitting radio frequency channel in each group of transmitting radio frequency channels, n is a positive integer, and the value of n ranges from 1 to N; and k represents the index of each sub-carrier, and $k=i\Delta d_{sc}^{In}+\Delta f_{sc}^{In}(n-1)$, where $\Delta d_{sc}^{In}$ represents the spacing between sub-carriers to which each transmitting radio frequency channel is mapped, and $\Delta f_{sc}^{In}$ represents the spacing between sub-carriers to which two adjacent transmitting radio frequency channels are mapped.

Particularly the transmission signals $s_n^{In}(k)$ of the N transmitting radio frequency channels can be generated by a signal processor which may be located at the radio frequency side or the baseband side in a physical entity. Particularly since the first group of transmitting radio frequency channels includes N transmitting radio frequency channels, the series of $s_n^{In}(k)$ can be written as $s_1^{In}(k)$, $s_2^{In}(k)$, $s_3^{In}(k)$ ..., $s_N^{In}(k)$.

Fourthly in the first to N-th transmitting radio frequency channels in the first group of transmitting radio frequency channels, Inverse Fast Fourier Transformation (IFFT) is performed respectively on $s_1^{In}(k)$, $s_2^{In}(k)$, $s_3^{In}(k)$ ..., $s_N^{In}(k)$, and a corresponding Cyclic Prefix (CP) is added thereto to form time domain signals $x_1^{In}(t)$, $x_2^{In}(t)$, $x_3^{In}(t)$, ..., $x_n^{In}(t)$, ..., $x_N^{In}(t)$ of the first to N-th transmitting radio frequency channels, where $x_n^{In}(t)$ represents the time domain signal of the N-th transmitting radio frequency channel, and t represents the sequence number of a temporal Orthogonal Frequency Division Multiplexing (OFDM) signal.

Fifthly the formed time domain signals $x_1^{In}(t)$, $x_2^{In}(t)$, $x_3^{In}(t)$, ..., $x_n^{In}(t)$, ..., $x_N^{In}(t)$ of the first to N-th transmitting radio frequency channels are transmitted respectively over the transmitting radio frequency channels in the first group. The coupling network processes $x_1^{In}(t)$, $x_2^{In}(t)$, $x_3^{In}(t)$, ..., $x_n^{In}(t)$, ..., $x_N^{In}(t)$ into a compositive signal upon reception of $x_1^{In}(t)$, $x_2^{In}(t)$, $x_3^{In}(t)$, ..., $x_n^{In}(t)$, ..., $x_N^{In}(t)$, and transmits the compositive signal to the calibration receiving channel to form feedback signals $y^{In}(t)$ of the intra-group transmission calibration pilot sequences corresponding to the first group of transmitting radio frequency channels.

Sixthly the CP is removed from the received feedback signals $y^{In}(t)$ of the intra-group transmission calibration pilot sequences corresponding to the first group of transmitting radio frequency channels, and Fast Fourier Transformation (FFT) is performed on the feedback signals to form a received frequency signal throughout the bandwidth. $y^{In}(t)$ can be processed by a signal processor which may be located at the radio frequency side or the baseband side in a physical entity.

Seventhly channel estimation is performed on the first group of transmitting radio frequency channels according to the feedback signals of the intra-group transmission calibration pilot sequences received over the calibration receiving channel, and the transmission calibration pilot sequences transmitted over the first group of transmitting radio frequency channels to obtain channel information of the corresponding sub-carriers, to which the intra-group transmission calibration pilot sequences are mapped, in the respective transmitting radio frequency channels in the first group of transmitting radio frequency channels, where the channel information of the corresponding sub-carriers of the intra-group transmission calibration pilot sequences mapped in the respective transmitting radio frequency channels in the first group of transmitting radio frequency channels is determined in Equation (9) of $$\tilde{H}_n(i) = \frac{z^{In}(k)}{s_n^{In}(k)} \quad (9)$$

In Equation (9) above:

k represents the index of each sub-carrier, and $k=i\Delta d_{sc}^{In}+\Delta f_{sc}^{In}(n-1)$; i represents an index, i is a positive integer, $0 \leq i < N_{sc}^{In}$, and $N_{sc}^{In}$, represents the length of an intra-group transmission calibration pilot sequence; n represents the index of each transmitting radio frequency channel in each group of transmitting radio frequency channel, n is a positive integer, and the value of n ranges from 1 to N; $\Delta d_{sc}^{In}$ represents the spacing between sub-carriers to which each transmitting radio frequency channel is mapped, and $\Delta f_{sc}^{In}$ represents the spacing between sub-carriers to which two adjacent transmitting radio frequency channels are mapped.

$z^{In}(k)$ represents a frequency signal in the entire bandwidth of a received feedback signal corresponding to an intra-group transmission calibration pilot sequence corresponding to the k-th sub-carrier of the first group of transmitting radio frequency channels;

$s_n^{In}(k)$ represents a transmission signal of the k-th sub-carrier of the n-th transmitting radio frequency channel in the first group of transmitting radio frequency channels; and $\tilde{H}_n(i)$ represents channel information of a corresponding sub-carrier of the i-th intra-group transmission calibration pilot sequence mapped in each transmitting radio frequency channel in the first group of transmitting radio frequency channels.

Eighthly in an implementation, channel estimation is performed on each group of transmitting radio frequency channels according to the feedback signals of the intra-group transmission calibration pilot sequences received over the calibration receiving channel, to obtain channel information corresponding to the sub-carriers to which the intra-group transmission calibration pilot sequences are mapped over each group of transmitting radio frequency channels; and interpolation is performed according to the channel information corresponding to the sub-carriers to which the intra-group transmission calibration pilot sequences are mapped over each group of transmitting radio frequency channels, to obtain channel information corresponding to all the sub-carriers over each group of transmitting radio frequency channels.

Particularly the channel information of the corresponding sub-carriers, to which the intra-group transmission calibration pilot sequences are mapped, in each transmitting radio frequency channel in the first group of transmitting radio frequency channels is calculated, and the indexes of the sub-carriers to which the intra-group transmission calibration pilot sequences are mapped are $k=i\Delta d_{sc}^{In}+\Delta f_{sc}^{In}(n-1)$, where i represents an index, i is a positive integer, $0 \leq i < N_{sc}^{In}$, and $N_{sc}^{In}$ represents the length of an intra-group transmission calibration pilot sequence; n represents the index of each transmitting radio frequency channel in each group of transmitting radio frequency channels, n is a positive integer, and the value of n ranges from 1 to N; $\Delta d_{sc}^{In}$ represents the spacing between sub-carriers to which each transmitting radio frequency channel is mapped, and $\Delta d_{sc}^{In}$ represents the spacing between sub-carriers to which two adjacent transmitting radio frequency channels are mapped.

As can be apparent, no corresponding channel estimation is performed on a sub-carrier to which no intra-group transmission calibration pilot sequence is mapped, so interpolation is performed on all the other sub-carriers of all the transmitting radio frequency channels in the first group of transmitting radio frequency channels based upon the determined channel information of the corresponding sub-carriers of the intra-group transmission calibration pilot sequences mapped in the respective transmitting radio frequency channels, to obtain the channel information of all the sub-carriers throughout the operating bandwidth of all the transmitting radio frequency channels in the first group of transmitting radio frequency channels.

So far the channel information $\tilde{H}_n(k)$ of all the sub-carriers throughout the operating bandwidth of all the transmitting radio frequency channels in the first group of transmitting radio frequency channels has been calculated in the operations above. Alike intra-group transmission calibration pilot sequences corresponding to the second group of transmitting radio frequency channels are transmitted in a transmission timeslot corresponding to the second group of transmitting radio frequency channels, feedback signals thereof are received, and channel information $\tilde{H}_{N+n}(k)$ of all the sub-carriers throughout the operating bandwidth of all the transmitting radio frequency channels in the second group of transmitting radio frequency channels is further determined. Channel information $\tilde{H}_{(m-1)\times N+n}(k)$ of all the sub-carriers throughout the operating bandwidth of all the transmitting radio frequency channels in the m-th group of transmitting radio frequency channels is determined sequentially, where m represents the number of a group including a transmitting radio frequency channel, and the value of m ranges from 1 to M, until channel information $\tilde{H}_{(M-1)\times N+n}(k)$ of all the sub-carriers throughout the operating bandwidth of all the transmitting radio frequency channels in the M-th group of transmitting radio frequency channels is determined.

An inter-channel compensation coefficient of each transmitting radio frequency channel is determined according to the channel information of the M groups of transmitting radio frequency channels.

In an implementation, the inter-channel compensation coefficient of each transmitting radio frequency channel is determined according to the channel information of each group of transmitting radio frequency channels in a number of schemes in the embodiments of the invention, several of which will be described below without any limitation thereto.

In a first scheme, an inter-channel compensation coefficient over each carrier of each transmitting radio frequency channel is determined in Equation (10) of:

$$\text{cal\_factor}_q(k) = \left( \sqrt{\frac{\sum_{q=1}^{MN} |\tilde{H}_q(k)|^2}{MN}} \right) / \tilde{H}_q(k) \quad (10)$$

In Equation (10):

M represents the total number of groups of transmitting radio frequency channels in the array of antennas;

N represents the total number of transmitting radio frequency channels in each group of transmitting radio frequency channels;

q=(m−1)N+n, where q represents the index of each transmitting radio frequency channel, and q is a positive integer;

$\tilde{H}_q(k)$ represents channel information of the k-th sub-carrier of the n-th transmitting radio frequency channel in the m-th group of transmitting radio frequency channels; and cal\_factor$_q$(k) represents an inter-channel compensation coefficient of the k-th sub-carrier of the n-th transmitting radio frequency channel in the m-th group of transmitting radio frequency channels.

In a second scheme, an inter-channel compensation coefficient over each carrier of each transmitting radio frequency channel is determined in Equation (11) of:

$$\text{cal\_factor}_q(k) = \frac{\sum_{q=1}^{MN} |\tilde{H}_q(k)|}{MN} \quad (11)$$

In Equation (11):

M represents the total number of groups of transmitting radio frequency channels in the array of antennas;

N represents the total number of transmitting radio frequency channels in each group of transmitting radio frequency channels;

q=(m−1)N+n, where q represents the index of each transmitting radio frequency channel, and q is a positive integer;

$\tilde{H}_q(k)$ represents channel information of the k-th sub-carrier of the n-th transmitting radio frequency channel in the m-th group of transmitting radio frequency channels; and cal\_factor$_q$(k) represents an inter-channel compensation coefficient of the k-th sub-carrier of the n-th transmitting radio frequency channel in the m-th group of transmitting radio frequency channels.

In a third scheme, an inter-channel compensation coefficient over each carrier of each transmitting radio frequency channel is the minimum of the channel information of the k-th sub-carriers of all the transmitting radio frequency channels.

In an implementation, a Field Programmable Gate Array (FPGA) interface is filled with the inter-channel compensation coefficients over the respective carriers of the respective transmitting radio frequency channels, both information about active transmitting radio frequency channels, and information about inactive transmitting radio frequency channels is written into the FPGA interface, and the information about the respective channels is transmitted to a BBU.

In an implementation, an embodiment of the invention further provides another implementation in which an inter-channel compensation coefficient of each transmitting radio frequency channel is determined in connection with a reference channel as described below in details.

Figure 5:
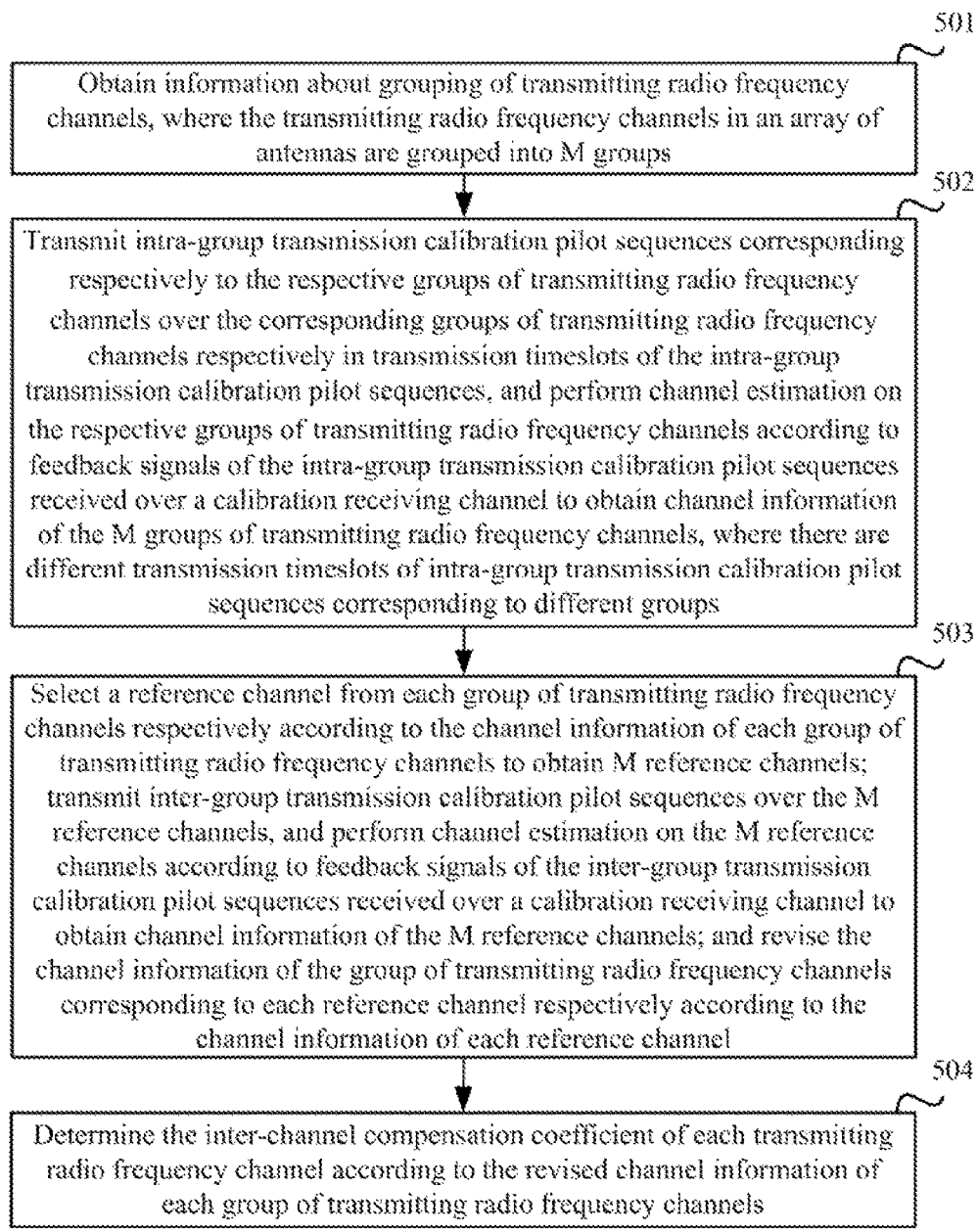
FIG. 5 is a schematic flow chart of another method for calibrating an antenna according to an embodiment of the invention.

FIG. 5 illustrates a schematic flow chart of another method for calibrating an antenna according to an embodiment of the invention, and as illustrated in FIG. 5, the method particularly includes the following operations:

The operation 501 is substantially the same as the flow performed in the operation 101 in the embodiments above;

The operation 502 is substantially the same as the flow performed in the operation 102 in the embodiments above;

The operation 503 is to select a reference channel from each group of transmitting radio frequency channels respectively according to the channel information of each group of transmitting radio frequency channels to obtain M reference channels; to transmit inter-group transmission calibration pilot sequences over the M reference channels, and to perform channel estimation on the M reference channels according to feedback signals of the inter-group transmission calibration pilot sequences received over a calibration receiving channel to obtain channel information of the M reference channels; and to revise the channel information of the group of transmitting radio frequency channels corresponding to each reference channel respectively according to the channel information of each reference channel; and The operation 504 is to determine the inter-channel compensation coefficient of each transmitting radio frequency channel according to the revised channel information of each group of transmitting radio frequency channels.

Particularly one of transmitting radio frequency channels in each group of transmitting radio frequency channels is selected as a reference channel of the group, so that M reference channels can be determined from the M groups of transmitting radio frequency channels. Channel estimation is performed on the M reference channels using inter-group transmission calibration pilot sequences. In an implementation, each reference channel may correspond respectively to an inter-group transmission calibration pilot sequence, and different reference channels may correspond to different inter-group transmission calibration pilot sequences; or the M reference channels may correspond to the same inter-group transmission calibration pilot sequence. The inter-group transmission calibration pilot sequences can be determined as described above.

In an implementation, a reference channel is selected from each group of transmitting radio frequency channels respectively according to the channel information of each group of transmitting radio frequency channels particularly as follows:

For each group of transmitting radio frequency channels, the following operations are performed:

Receive power of each transmitting radio frequency channel in the group of transmitting radio frequency channels is determined; and Transmitting radio frequency channels with their receive power being not below a first threshold as active transmitting radio frequency channels, and a reference channel is selected from all the active transmitting radio frequency channels in the group of transmitting radio frequency channels according to the receive power of all the active transmitting radio frequency channels in the group of transmitting radio frequency channels.

The following description will be made in details taking particularly the first group of transmitting radio frequency channels as an example. Firstly receive power of each transmitting radio frequency channel in the first group of transmitting radio frequency channels is determined according to channel information of each transmitting radio frequency channel in the first group of transmitting radio frequency channels in Equation (12) of:

$$P_n = \sum_{k=0}^{N_{RB} N_{sc}^{RB} - 1} |\tilde{H}_q(k)|^2 \quad (12)$$

In Equation (12):

k represents the index of each sub-carrier;

$N_{RB}$ represents the number of resource blocks in a system operating bandwidth of a single transmitting radio frequency channel, and $N_{sc}^{RB}$ represents the number of sub-carriers in each resource block;

$P_n$ represents receive power of the n-th transmitting radio frequency channel in the first group of transmitting radio frequency channels; and $\tilde{H}_n(k)$ represents channel information of the k-th sub-carrier of the n-th transmitting radio frequency channel in the first group of transmitting radio frequency channels.

In an implementation, a first threshold is determined, and if receive power of some channel is below the first threshold, then the channel will be determined as an inactive transmitting radio frequency channel; otherwise, the transmitting radio frequency channel with the receive power being not below the first threshold will be determined as an active transmitting radio frequency channel. The antenna channel may become inactive due to a failure thereof or another factor, so the inactive transmitting radio frequency channel may be discarded for being selected as a reference channel.

Particularly a reference channel can be selected from all the active transmitting radio frequency channels in the group of transmitting radio frequency channels according to the receive power of all the active transmitting radio frequency channels in the group of transmitting radio frequency channels in a number of schemes, and two common schemes thereof will be described below.

In a first scheme, the average of the receive power of all the active transmitting radio frequency channels in the group can be calculated, the receive power of the active channels more than the average of the receive power in the first group of transmitting radio frequency channels can be sorted, and a channel with the closest receive power to the average power can be selected from the active transmitting radio frequency channels with their receive power more than the average of the receive power as a reference channel $n^{Ref}(1)$ of the first group of transmitting radio frequency channels.

In a second scheme, a channel with the highest receive power in the first group of transmitting radio frequency channels can be selected as a reference channel $n^{Ref}(1)$ of the first group of transmitting radio frequency channels.

Alike a reference channel $n^{Ref}(2)$ of the second group of transmitting radio frequency channels is determined according to the channel information $\tilde{H}_{N+n}(k)$ of each transmitting radio frequency channel in the second group of transmitting radio frequency channels; a reference channel $n^{Ref}(m)$ of the m-th group of transmitting radio frequency) channels is determined according to the channel information $\tilde{H}_{(m-1) \times N+n}(k)$ of each transmitting radio frequency channel in the m-th group of transmitting radio frequency channels; . . . ; and a reference channel $n^{Ref}(M)$ of the M-th group of transmitting radio frequency channels is determined according to the channel information $\tilde{H}_{M \times N+n}(k)$ of each transmitting radio frequency channel in the M-th group of transmitting radio frequency channels.

As can be apparent, the reference channels $n^{Ref}(m)$ of the respective groups of transmitting radio frequency channels are determined respectively as described above, where m represents the sequence number of each group of transmitting radio frequency channels, m is a positive integer, and the value of m ranges from 1 to M.

In an implementation, information about the active transmitting radio frequency channels in each group of transmitting radio frequency channels is stored, and subsequently can be transmitted to a Building Baseband Unit (BBU) for processing by the BBU. For example, if the BBU knows that some transmitting radio frequency channel is an inactive transmitting radio frequency channel, then the BBU subsequently transmitting a signal may discard the inactive transmitting radio frequency channel, may report of the failure, etc.

Channel estimation on a reference channel will be described below in details.

Firstly the inter-group transmission calibration pilot sequences of the determined reference channels of the respective groups of transmitting radio frequency channels are determined as described above.

Secondly a pattern in which the inter-group transmission calibration pilot sequences corresponding to the reference channels are mapped in the reference channels is determined. Since the total number M of reference channels is less than the total number of all the antennas in the array of antennas at a large scale, the inter-group transmission calibration pilot sequences can be mapped in the reference channels in a number of patterns.

In a first pattern, the inter-group transmission calibration pilot sequences are transmitted over the M reference channels in a transmission timeslot of the inter-group transmission calibration pilot sequences in the current calibration period, where the inter-group transmission calibration pilot sequences are transmitted over different frequency resources of the M reference channels.

Particularly if the inter-group transmission calibration pilot sequences mapped onto the group of reference channels are transmitted in a transmission timeslot, then the inter-group transmission calibration pilot sequences will be mapped onto different frequency resources corresponding to the respective reference channels in the frequency division mode.

In an implementation, as illustrated in FIG. 3, the inter-group transmission calibration pilot sequences mapped onto the reference channels are transmitted in the fourth transmission timeslot 309, where the time interval between the inter-group transmission calibration pilot sequences mapped onto the reference channels, and the intra-group transmission calibration pilot sequences mapped onto the M-th group of transmitting radio frequency channels is a reference channel calibration offset 310, i.e., $\Delta T^{Ref}$; and if the interval between transmission timeslots of every two adjacent groups of transmitting radio frequency channels is an inter-group transmission calibration offset 302, i.e., $\Delta T^{In}$, then the period of time from the time when the intra-group transmission calibration pilot sequences start to be transmitted over the first group of transmitting radio frequency channels, to the time when the inter-group transmission calibration pilot sequences are transmitted over the reference channels will be a transmission calibration offset 311, i.e., $\Delta T$, where $\Delta T=(M-1)\Delta T^{In}+\Delta T^{Ref}$. In an implementation, the transmission timeslots are guard timeslots.

In a second pattern, the inter-group transmission calibration pilot sequences mapped onto the respective reference channels are transmitted respectively in different timeslots in the time division mode to perform channel estimation on the respective reference channels. At this time, the inter-group transmission calibration pilot sequences can be mapped onto any frequency resources of the respective reference channels.

In a third pattern, channel estimation is performed on the respective reference channels in the code division mode.

For the sake of a convenient description, the frequency division mode in the first implementation will be described below in an embodiment of the invention, but channel estimation on the reference channels will not be limited thereto. In an embodiment of the invention, the reference channels are regarded as a group, and the inter-group transmission calibration pilot sequences corresponding to the reference channels are transmitted in a transmission timeslot.

The inter-group transmission calibration pilot sequences may be mapped onto different frequency resources corresponding to each reference channel in a number of patterns. In an implementation, the inter-group transmission calibration pilot sequences are mapped onto the sub-carriers in the entire operating bandwidth of each reference channel, where the spacing between sub-carriers to which each reference channel is mapped is a first sub-carrier offset more than or equal to M, and the spacing between sub-carriers to which two adjacent reference channels are mapped is a second sub-carrier offset less than the first sub-carrier offset. The inter-group transmission calibration pilot sequences are mapped onto different frequency resources corresponding to each reference channel in a pattern similar to the pattern in which the intra-group transmission calibration pilot sequences are mapped onto different frequency resources corresponding to each transmitting radio frequency channel in each group of transmitting radio frequency channels.

In an implementation, the spacing between sub-carriers to which each reference channel is mapped, and the spacing between sub-carriers to which two adjacent reference channels are mapped are determined as describe above, and the inter-group transmission calibration pilot sequences corresponding to the reference channels are mapped into the respective reference channels at the spacing between sub-carriers to which each reference channel is mapped, and the spacing between sub-carriers to which two adjacent reference channels are mapped. The spacing between sub-carriers to which two adjacent reference channels are mapped is determined in Equation (13) of:

$$\Delta f_{sc}^{Ref} = \left\lfloor \frac{\Delta d_{sc}^{Ref}}{M} \right\rfloor \quad (13)$$

In Equation (13) above:

$\Delta d_{sc}^{Ref}$ represents the spacing between sub-carriers to which each reference channel is mapped;

M represents the total number of transmitting radio frequency channels;

$\lfloor \cdot \rfloor$ represents rounding down; and $\Delta f_{sc}^{Ref}$ represents the spacing between sub-carriers to which two adjacent reference channels are mapped.

Figure 6:
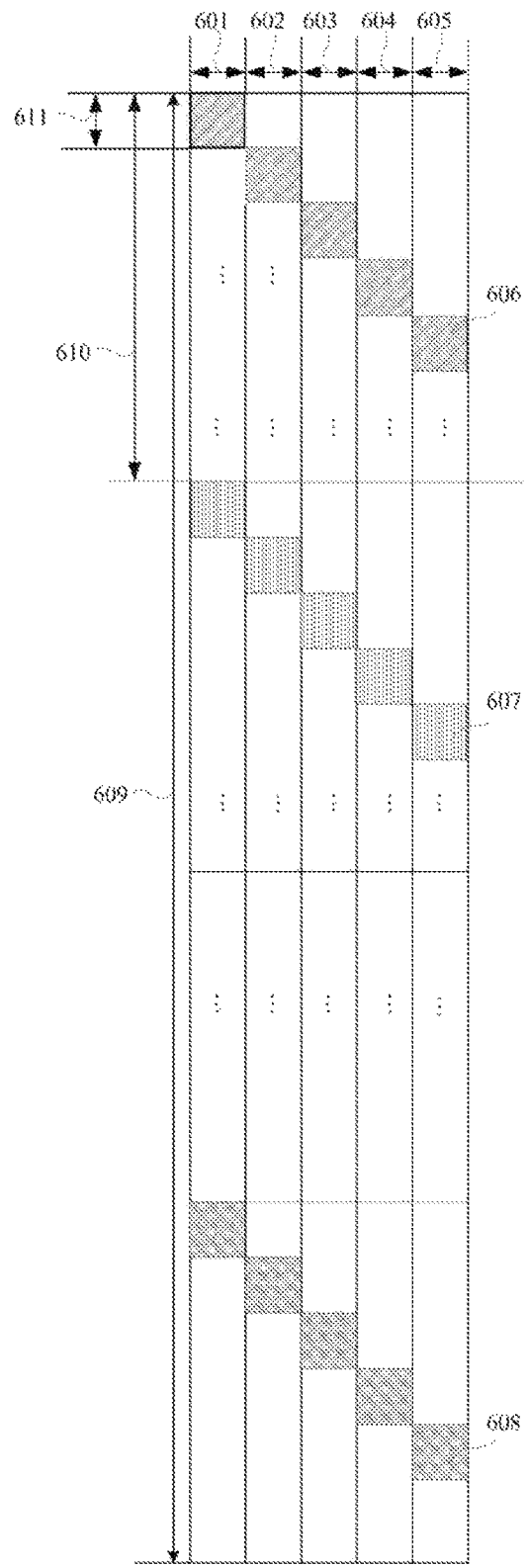
FIG. 6 is a schematic diagram of mapping inter-group transmission calibration pilot sequences onto sub-carriers in the entire operating bandwidth of reference channels according to an embodiment of the invention.

Particularly as illustrated in FIG. 6, FIG. 6 illustrates a schematic diagram of mapping inter-group transmission calibration pilot sequences onto sub-carriers in the entire operating bandwidth of reference channels according to an embodiment of the invention. As illustrated, there is a schematic diagram of reference channels, where there are five groups of reference channels in total in the array of antennas, that is, M is 5, and since each group of reference channels corresponds to a reference channel, there are five reference channels in total in the array of antennas, which are a first reference channel 601, a second reference channel 602, a third reference channel 603, a fourth reference channel 604, and a fifth reference channel 605 respectively, and each reference channel corresponds to an operating bandwidth 609 including all the sub-carriers in the corresponding reference channel.

The spacing between sub-carriers to which each reference channel is mapped is a first sub-carrier offset 610. Particularly in FIG. 6, the spacing between a first inter-group transmission calibration pilot sequence 606 and a second inter-group transmission calibration pilot sequence 607 mapped in the first reference channel 601 is the first sub-carrier offset 610. The spacing between sub-carriers to which two adjacent reference channels are mapped is a second sub-carrier offset 611. Particularly in FIG. 6, the spacing between the first inter-group transmission calibration pilot sequence 606 in the first reference channel 601, and the first inter-group transmission calibration pilot sequence 606 in the second reference channel 602 is the second sub-carrier offset 611.

The inter-group transmission calibration pilot sequences corresponding to each reference channel are determined as described above as $c^{Ref}(0)$, $c^{Ref}(1)$, $c^{Ref}(2)$, ... $c^{Ref}(j)$ ... $c^{Ref}(N_{sc}^{Ref}-1)$ respectively, where $C^{Ref}(j)$ represents the j-th inter-group transmission calibration pilot sequence corresponding to the reference channel, j represents an index, $0 \le j < N_{sc}^{Ref}$ and $N_{sc}^{Ref}$ j represents the length of an inter-group transmission calibration pilot sequence. All the inter-group transmission calibration pilot sequences are mapped respectively into each reference channel. As illustrated in FIG. 6, firstly $c^{Ref}(0)$ i.e., the first inter-group transmission calibration pilot sequence 606, is mapped into each reference channel, next $c^{Ref}(1)$, i.e., the second inter-group transmission calibration pilot sequence 607, is mapped into each reference channel, and the inter-group transmission calibration pilot sequences determined are mapped respectively into each reference channel sequentially, until lastly $c^{Ref}(N_{sc}^{Ref}-1)$ i.e., the $(N_{sc}^{Ref}-1)$-th inter-group transmission calibration pilot sequence 608, is mapped into each reference channel.

As can be apparent from FIG. 6, if the inter-group transmission calibration pilot sequences corresponding respectively to each group of reference channels are mapped onto the sub-carriers in the entire operating bandwidth of the reference channels in the frequency division mode, then the distance denoted by the first sub-carrier offset 610 in FIG. 6 may be the spacing $\Delta d_{sc}^{Ref}$ between sub-carriers to which each transmitting radio frequency channel is mapped. Since inter-group transmission calibration pilot sequences need to be mapped onto different frequency resources in each reference channel in the group of reference channels within the first sub-carrier offset 610, $\Delta d_{sc}^{Ref} \ge 5$ shall be satisfied in FIG. 6 so that there is an inter-group transmission calibration pilot sequence mapped onto each of five reference channels within each first sub-carrier offset 610 among the reference channels in FIG. 6, and the respective inter-group transmission calibration pilot sequences are mapped onto different frequency resources.

In an implementation, if the first sub-carrier offset 610 is set larger, then the inter-group transmission calibration pilot sequences mapped into the respective reference channels may be arranged uniformly in the first sub-carrier offset 610. For example, the second sub-carrier offset 611 illustrated in FIG. 6 is the spacing of one sub-carrier. In an implementation, the second sub-carrier offset 611 may alternatively be the spacing of more than one sub-carrier, but the embodiments of the invention will not be limited to any particular spacing. The second sub-carrier offset 611 in FIG. 6 is the spacing between sub-carriers to which two adjacent transmitting radio frequency channels are mapped.

Thirdly the inter-group transmission calibration pilot sequences corresponding to the reference channels are mapped into each reference channel, and transmission signals of the M reference channels are generated, where the transmission signals of the M reference channels are generated in Equation (14) of:

$$s_m^{Ref}(k) = c^{Ref}(j) \qquad (14)$$

In Equation (14) above:

j represents an index, $0 \le j < N_{sc}^{Ref}$, and $N_{sc}^{Ref}$ represents the length of an inter-group transmission calibration pilot sequence;

$c^{Ref}(j)$ represents the j-th inter-group transmission calibration pilot sequence corresponding to the reference channel;

m represents the sequence number of the group including a transmitting radio frequency channel which is the reference channel, m is a positive integer, and the value of m ranges from 1 to M;

k represents the index of each sub-carrier, $k = j\Delta d_{sc}^{Ref} + \Delta f_{sc}^{Ref}(m-1)$, and the value of k ranges from 0 to $N_{RB} N_{sc}^{RB}-1$, where $N_{RB}$ represents the number of resource blocks in a system operating bandwidth of a single transmitting radio frequency channel, and $N_{sc}^{RB}$ represents the number of sub-carriers in each resource block; $\Delta d_{sc}^{Ref}$ represents the spacing between sub-carriers to which each reference channel is mapped, and $\Delta f_{sc}^{In}$ represents the spacing between sub-carriers to which two adjacent reference channels are mapped; and $s_m^{Ref}(k)$ represents a transmission signal of the k-th sub-carrier of a reference channel corresponding to the m-th group of transmitting radio frequency channels.

Particularly the transmission signals of the M transmitting radio frequency channels can be generated by a signal processor which may be located at the radio frequency side or the baseband side in a physical entity. Particularly since the reference channels include M transmitting radio frequency channels, the series of transmission signals of the M transmitting radio frequency channels can be written as $s_1^{Ref}(k)$, $s_2^{Ref}(k)$, $s_3^{Ref}(k)$, ..., $s_M^{Ref}(k)$.

Fourthly in the first to M-th reference channels in the reference channels, IFFT is performed respectively on $s_1^{Ref}(k)$, $s_2^{Ref}(k)$, $s_3^{Ref}(k)$, ..., $s_M^{Ref}(k)$, and a corresponding CP is added thereto to form time domain signals $x_1^{Ref}(t)$, $x_2^{Ref}(t)$, $x_3^{Ref}(t)$, ..., $x_m^{Ref}(t)$, ..., $x_M^{Ref}(t)$ of the first to M-th reference channels, where $x_m^{Ref}(t)$ represents the time domain signal of the m-th reference channel, and t represents the sequence number of a temporal OFDM symbol.

Fifthly the formed time domain signals $x_1^{Ref}(t)$, $x_2^{Ref}(t)$, $x_3^{Ref}(t)$, ..., $x_m^{Ref}(t)$, ..., $x_M^{Ref}(t)$ of the first to M-th reference channels are transmitted respectively over the reference channels.

The coupling network processes $x_1^{Ref}(t)$, $x_2^{Ref}(t)$, $x_3^{Ref}(t)$, ..., $x_m^{Ref}(t)$, ..., $x_M^{Ref}(t)$ into a compositive signal upon reception of $x_1^{Ref}(t)$, $x_2^{Ref}(t)$, $x_3^{Ref}(t)$, ..., $x_m^{Ref}(t)$, ..., $x_M^{Ref}(t)$, and transmits the compositive signal to the calibration receiving channel to form feedback signals $y^{Ref}(t)$ of the inter-group transmission calibration pilot sequences corresponding to the reference channels.

Sixthly the CP is removed from the received feedback signals $y^{Ref}(t)$ of the inter-group transmission calibration pilot sequences corresponding to the reference channels, and FFT is performed on the feedback signals to form a received frequency signal throughout the bandwidth. $y^{Ref}(t)$ can be processed by a signal processor which may be located at the radio frequency side or the baseband side in a physical entity.

Seventhly channel estimation is performed on the reference channels according to the frequency signal in the entire bandwidth of the feedback signals of the inter-group transmission calibration pilot sequences received over the calibration receiving channel, and the transmission signals of the reference channels corresponding to the transmitting radio frequency channels transmitted over the reference channels to obtain channel information of the corresponding sub-carriers, to which the inter-group transmission calibration pilot sequences are mapped, in the respective transmitting radio frequency channels in the reference channels, where the channel information of the corresponding sub-carriers of the inter-group transmission calibration pilot sequences mapped in the reference channels corresponding to each group of transmitting radio frequency channels is determined in Equation (15) of:

$$\tilde{H}_m^{Ref}(j) = \frac{z^{Ref}(k)}{s_m^{Ref}(k)} \quad (15)$$

In Equation (15) above:

k represents the index of each sub-carrier, $k=j\Delta d_{sc}^{Ref}+\Delta f_{sc}^{Ref}(m-1)$ and the value of k ranges from 0 to $N_{RB}N_{sc}^{RB}-1$, where $N_{RB}$ represents the number of resource blocks in a system operating bandwidth of a single transmitting radio frequency channel, and $N_{sc}^{RB}$ represents the number of sub-carriers in each resource block; j represents an index, $0 \le j < N_{sc}^{Ref}$, $N_{sc}^{Ref}$ represents the length of an inter-group transmission calibration pilot sequence, m represents the number of the group including a transmitting radio frequency channel which is the reference channel, m is a positive integer, and the value of m ranges from 1 to M; $\Delta d_{sc}^{Ref}$ represents the spacing between sub-carriers to which each reference channel is mapped; and $\Delta f_{sc}^{Ref}$ represents the spacing between sub-carriers to which two adjacent reference channels are mapped.

$s_m^{Ref}(k)$ represents a transmission signal of the k-th sub-carrier of the reference channel corresponding to the m-th group of transmitting radio frequency channels;

$z^{Ref}(k)$ represents a frequency signal in the entire bandwidth of a received feedback signal corresponding to an inter-group transmission calibration pilot sequence corresponding to the k-th sub-carrier of the reference channel; and $\tilde{H}_m^{Ref}(j)$ represents channel information of a corresponding sub-carrier of the j-th inter-group transmission calibration pilot sequence mapped in the reference channel corresponding to the m-th group of transmitting radio frequency channels.

Eighthly in an implementation, channel estimation is performed on the M reference channels according to the feedback signals of the inter-group transmission calibration pilot sequences received over the calibration receiving channel particularly as follows:

Channel estimation is performed on the M reference channels according to the feedback signals of the inter-group transmission calibration pilot sequences received over the calibration receiving channel, to obtain channel information corresponding to the sub-carriers to which the inter-group transmission calibration pilot sequences are mapped over each reference channel; and interpolation is performed according to the channel information corresponding to the sub-carriers to which the inter-group transmission calibration pilot sequences are mapped over each reference channel, to obtain channel information corresponding to all the sub-carriers over each reference channel.

Particularly the channel information of the corresponding sub-carriers, to which the inter-group transmission calibration pilot sequences are mapped, in the reference channels is calculated, and the indexes of the sub-carriers are $k=j\Delta d_{sc}^{Ref}+\Delta f_{sc}^{Ref}(m-1)$, where j represents an index, $0 \le j < N_{sc}^{Ref}$, and $N_{sc}^{Ref}$ represents the length of an inter-group transmission calibration pilot sequence; m represents the number of a group including a transmitting radio frequency channel which is a reference channel, m is a positive integer, and the value of m ranges from 1 to M; the value of k ranges from 0 to $N_{RB}N_{sc}^{RB}-1$, where N represents the number of resource blocks in a system operating bandwidth of a single transmitting radio frequency channel, and $N_{sc}^{RB}$ represents the number of sub-carriers in each resource block; $\Delta d_{sc}^{Ref}$ represents the spacing between sub-carriers to which each reference channel is mapped; and $\Delta f_{sc}^{Ref}$ represents the spacing between sub-carriers to which two adjacent reference channels are mapped. As can be apparent, no corresponding channel estimation is performed on a sub-carrier to which no inter-group transmission calibration pilot sequence is mapped, so interpolation is performed on all the other sub-carriers in the reference channels based upon the determined channel information of the corresponding sub-carriers of the inter-group transmission calibration pilot sequences mapped in the reference channels corresponding to the respective groups of transmitting radio frequency channels, to obtain the channel information of all the sub-carriers throughout the operating bandwidth of the reference channels.

So far the channel information of all the sub-carriers throughout the operating bandwidth of the reference channels has been calculated in the operations above. Alike In an implementation, channel information of a group of transmitting radio frequency channels corresponding to each reference channel can be revised respectively according to channel information of each reference channel, and particularly for each group of transmitting radio frequency channels:

The ratio of channel information obtained based upon the inter-group transmission calibration pilot sequences, to channel information based upon the intra-group transmission calibration pilot sequences, of the reference channel of the group of transmitting radio frequency channels as a revision coefficient corresponding to the group of transmitting radio frequency channels; and The product of the revision coefficient corresponding to the group of transmitting radio frequency channels, and the channel information of each transmitting radio frequency channel in the group of transmitting radio frequency channels obtained based upon the intra-group transmission calibration pilot sequences as revised channel information of each transmitting radio frequency channel in the group of transmitting radio frequency channels.

Particularly the index of a reference channel of each group of transmitting radio frequency channels among all the transmitting radio frequency channels is determined as $q^{Ref}(m)=(m-1)N+n^{Ref}(m)$ according to the channel information of all the sub-carriers in the entire operating bandwidth of the M reference channels, where $n^{Ref}(m)$ represents the index of a reference channel of the m-th group of transmitting radio frequency channels among the transmitting radio frequency channels in the original group, and the value of $n^{Ref}(m)$ ranges from 1 to N.

Accordingly the revision coefficient of each group of transmitting radio frequency channels is calculated according to the channel information of the reference channel of each group of transmitting radio frequency channels obtained based upon the inter-group transmission calibration pilot sequences, and the channel information of the reference channel of each group of transmitting radio frequency channels obtained based upon the intra-group transmission calibration pilot sequences in Equation (16) of:

$$F_m(k) = \frac{\tilde{H}_m^{Ref}(k)}{\tilde{H}_{q^{Ref}(m)}(k)} \quad (16)$$

In Equation (16) above:

k represents the index of each sub-carrier, and the value of k ranges from 0 to $N_{RB}N_{sc}^{RB}-1$, where $N_{RB}$ represents the number of resource blocks in a system operating bandwidth of a single transmitting radio frequency channel, and $N_{sc}^{RB}$ represents the number of sub-carriers in each resource block;

$\tilde{H}_m^{Ref}(k)$ represents channel information of the k-th sub-carrier of the reference channel of the m-th group of transmitting radio frequency channels based upon the inter-group transmission calibration pilot sequence;

$\tilde{H}_{q^{Ref}(m)}(k)$ represents channel information of the k-th sub-carrier of the reference channel of the m-th group of transmitting radio frequency channels based upon the intra-group transmission calibration pilot sequence; and $F_m(k)$ represents a revision coefficient of the k-th sub-carrier of the m-th group of transmitting radio frequency channels.

Next channel information of each sub-carrier in each transmitting radio frequency channel in each group of transmitting radio frequency channels is revised using the revision coefficient of each group of transmitting radio frequency channels in Equation (17) of:

$$\tilde{H}_{(m-1)N+n}^{modify}(k) = F_m(k)\tilde{H}_{(m-1)N+n}(k) \qquad (17)$$

In Equation (17) above:

$F_m(k)$ represents a revision coefficient of the k-th sub-carrier of the m-th group of transmitting radio frequency channels;

$\tilde{H}_{(m-1)N+n}(k)$ represents channel information of the k-th sub-carrier of the n-th transmitting radio frequency channel in the m-th group of transmitting radio frequency channels; and $\tilde{H}_{(m-1)N+n}^{modify}(k)$ represents revised channel information of k-th sub-carrier of the n-th transmitting radio frequency channel in the m-th group of transmitting radio frequency channels.

In an implementation, an inter-channel compensation coefficient of each transmitting radio frequency channel can be determined according to the revised channel information of each group of transmitting radio frequency channels in a number of schemes in the embodiments of the invention, several of which will be described below without any limitation thereto.

In a first scheme, an inter-channel compensation coefficient over each carrier of each transmitting radio frequency channel is determined in Equation (18) of:

$$\text{cal\_factor}_q(k) = \left(\sqrt{\frac{\sum_{q=1}^{MN}|\tilde{H}_q^{modify}(k)|^2}{MN}}\right)/\tilde{H}_q^{modify}(k) \qquad (18)$$

In Equation (18) above:

M represents the total number of groups of transmitting radio frequency channels in the array of antennas;

N represents the total number of transmitting radio frequency channels in each group of transmitting radio frequency channels;

q=(m−1)N+n, where q represents the index of each transmitting radio frequency channel, and q is a positive integer;

$\tilde{H}_q^{modify}(k)$ represents revised channel information of the k-th sub-carrier of the n-th transmitting radio frequency channel in the m-th group of transmitting radio frequency channels; and cal_factor$_q$(k) represents an inter-channel compensation coefficient of the k-th sub-carrier of the n-th transmitting radio frequency channel in the m-th group of transmitting radio frequency channels.

In a second scheme, an inter-channel compensation coefficient over each carrier of each transmitting radio frequency channel is determined in Equation (19) of:

$$\text{cal\_factor}_q(k) = \frac{\sum_{q=1}^{MN}|\tilde{H}_q^{modify}(k)|}{MN} \qquad (19)$$

In Equation (19) above:

M represents the total number of groups of transmitting radio frequency channels in the array of antennas;

N represents the total number of transmitting radio frequency channels in each group of transmitting radio frequency channels;

q=(m−1)N+n, where q represents the index of each transmitting radio frequency channel, and q is a positive integer;

$\tilde{H}_q^{modify}(k)$ represents revised channel information of the k-th sub-carrier of the n-th transmitting radio frequency channel in the m-th group of transmitting radio frequency channels; and cal_factor$_q$(k) represents an inter-channel compensation coefficient of the k-th sub-carrier of the n-th transmitting radio frequency channel in the m-th group of transmitting radio frequency channels.

In a third scheme, an inter-channel compensation coefficient over each carrier of each transmitting radio frequency channel is the minimum of the revised channel information of the k-th sub-carriers of all the transmitting radio frequency channels.

In an implementation, an FPGA interface is filled with the inter-channel compensation coefficients cal_factor$_q$(k) over the respective carriers of the respective transmitting radio frequency channels, both information about active transmitting radio frequency channels, and information about inactive transmitting radio frequency channels is written into the FPGA interface, and the information about the respective channels is transmitted to a BBU.

As can be apparent from the description above, in an implementation, Q transmitting radio frequency channels are grouped into M groups, and intra-group transmission calibration pilot sequences are mapped onto different resources in the respective groups of transmission radio frequency channels in the FDM mode, in the embodiments of the invention. The different groups of intra-group transmission calibration pilot sequences are transmitted in different transmission timeslots in the Time Division Multiplexing (TDM) mode among the M groups of intra-group transmission calibration pilot sequences.

As can be apparent from the disclosure above, the transmitting radio frequency channels in the array of antenna are grouped into M groups, and the intra-group transmission calibration pilot sequences of the corresponding groups are transmitted respectively in the transmission timeslots corresponding respectively to the respective groups of transmitting radio frequency channels, where the transmission timeslots of the intra-group transmission calibration pilot sequences corresponding to the different groups are different from each other, that is, for the M groups transmitting radio frequency channels, the intra-group transmission calibration pilot sequences of the respective groups of transmitting radio frequency channels are transmitted in the different transmission timeslots in the time division mode, so channel estimation can be performed separately on each group of transmitting radio frequency channels, and if channel estimation is performed on each group of transmitting radio frequency channels in the frequency division mode, then simply the intra-group transmission calibration pilot sequences will be transmitted over different frequency resources in respective transmitting radio frequency channels in a group, that is, for each group of transmitting radio frequency channels, intra-group transmission calibration pilot sequences corresponding to each group can be mapped into the group of transmitting radio frequency channels in the frequency division mode, so there are such a smaller number of transmitting radio frequency channels in each group that longer intra-group transmission calibration pilot sequences can be mapped onto the respective radio frequency channels in the group in the frequency division mode; and furthermore there is an increase in the length of the intra-group transmission calibration pilot sequences for channel estimation mapped onto the respective radio frequency channels, the precision of the determined inter-channel compensation coefficients of the respective transmitting radio frequency channels can be improved.

Figure 7:
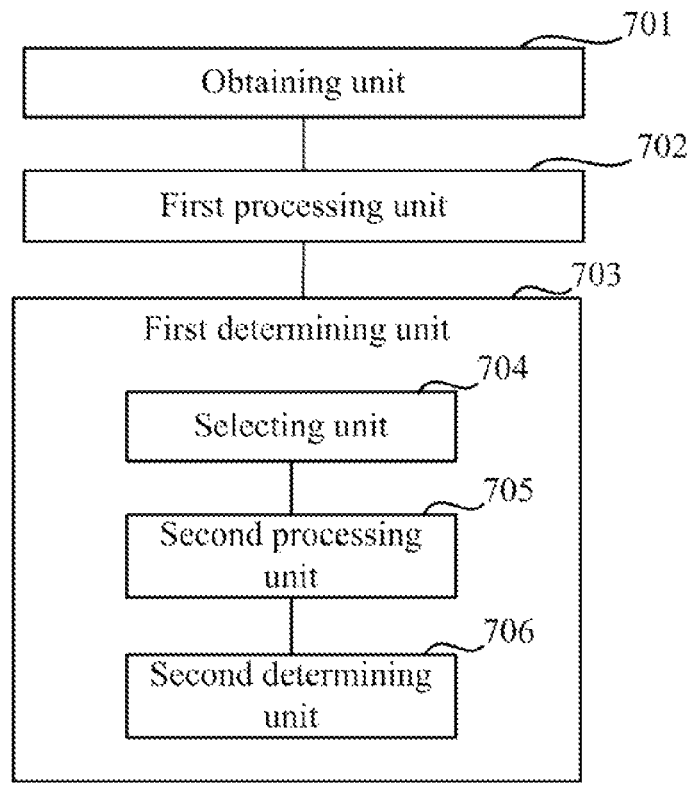
FIG. 7 is a schematic structural diagram of an apparatus for calibrating an antenna according to an embodiment of the invention.

FIG. 7 illustrates a schematic structural diagram of an apparatus for calibrating an antenna.

Based upon the same idea, an embodiment of the invention provides an apparatus for calibrating an antenna as illustrated in FIG. 7, which includes an obtaining unit 701, a first processing unit 702, and a first determining unit 703, where the first determining unit 703 further includes a selecting unit 704, a second processing unit 705, and a second determining unit 706;

The obtaining unit 701 is configured to obtain information about grouping of transmitting radio frequency channels, where the transmitting radio frequency channels in an array of antennas are grouped into M groups, and M is an integer more than 1;

The first processing unit 702 is configured to transmit intra-group transmission calibration pilot sequences corresponding respectively to the respective groups of transmitting radio frequency channels over the corresponding groups of transmitting radio frequency channels respectively in transmission timeslots of the intra-group transmission calibration pilot sequences, and to perform channel estimation on the respective groups of transmitting radio frequency channels according to feedback signals of the intra-group transmission calibration pilot sequences received over a calibration receiving channel to obtain channel information of the M groups of transmitting radio frequency channels, where there are different transmission timeslots of intra-group transmission calibration pilot sequences corresponding to different groups; and The first determining unit 703 is configured to determine inter-channel compensation coefficients of the respective transmitting radio frequency channels according to the channel information of the M groups of transmitting radio frequency channels.

In an implementation, each group of transmitting radio frequency channels includes N transmitting radio frequency channels, where N is 1, or N is an integer more than 1. If N is an integer more than 1, then intra-group transmission calibration pilot sequences will be transmitted over different frequency resources in respective transmitting radio frequency channels in a group.

In an implementation, the first determining unit 703 includes:

The selecting unit 704 is configured to select a reference channel from each group of transmitting radio frequency channels respectively according to the channel information of each group of transmitting radio frequency channels to obtain M reference channels;

The second processing unit 705 is configured to transmit inter-group transmission calibration pilot sequences over the M reference channels, and to perform channel estimation on the M reference channels according to feedback signals of the inter-group transmission calibration pilot sequences received over the calibration receiving channel to obtain channel information of the M reference channels; and The second determining unit 706 is configured to revise the channel information of the group of transmitting radio frequency channels corresponding to each reference channel respectively according to the channel information of each reference channel; and to determine the inter-channel compensation coefficient of each transmitting radio frequency channel according to the revised channel information of each group of transmitting radio frequency channels.

In an implementation, the selecting unit 704 is configured:

For each group of transmitting radio frequency channels,

To determine receive power of each transmitting radio frequency channel in the group of transmitting radio frequency channels; and To determine transmitting radio frequency channels with their receive power being not below a first threshold as active transmitting radio frequency channels, and to select a reference channel from all the active transmitting radio frequency channels in the group of transmitting radio frequency channels according to the receive power of all the active transmitting radio frequency channels in the group of transmitting radio frequency channels.

The second processing unit 705 is configured:

To map the inter-group transmission calibration pilot sequences onto the sub-carriers in the entire operating bandwidth of each reference channel, where the spacing between sub-carriers to which each reference channel is mapped is a first sub-carrier offset more than or equal to M, and the spacing between sub-carriers to which two adjacent reference channels are mapped is a second sub-carrier offset less than the first sub-carrier offset.

In an implementation, the second processing unit 705 is configured:

To transmit the inter-group transmission calibration pilot sequences over the M reference channels in a transmission timeslot of the inter-group transmission calibration pilot sequences in the current calibration period, where the inter-group transmission calibration pilot sequences are transmitted over different frequency resources of the M reference channels.

In an implementation, the second processing unit 705 is configured:

To perform channel estimation on the M reference channels according to the feedback signals of the inter-group transmission calibration pilot sequences received over the calibration receiving channel, to obtain channel information corresponding to the sub-carriers to which the inter-group transmission calibration pilot sequences are mapped over each reference channel; and To perform interpolation according to the channel information corresponding to the sub-carriers to which the inter-group transmission calibration pilot sequences are mapped over each reference channel, to obtain channel information corresponding to all the sub-carriers over each reference channel.

In an implementation, the second determining unit 706 is configured:

For each group of transmitting radio frequency channels,

To calculate a ratio of channel information obtained based upon the inter-group transmission calibration pilot sequences, to channel information based upon the intra-group transmission calibration pilot sequences, of the reference channel of the group of transmitting radio frequency channels as a revision coefficient corresponding to the group of transmitting radio frequency channels; and To calculate a product of the revision coefficient corresponding to the group of transmitting radio frequency channels, and the channel information of each transmitting radio frequency channel in the group of transmitting radio frequency channels obtained based upon the intra-group transmission calibration pilot sequences as revised channel information of each transmitting radio frequency channel in the group of transmitting radio frequency channels.

In an implementation, the second processing unit 705 is configured:

To perform channel estimation on each group of transmitting radio frequency channels according to the feedback signals of the intra-group transmission calibration pilot sequences received over the calibration receiving channel, to obtain channel information corresponding to the sub-carriers to which the intra-group transmission calibration pilot sequences are mapped over each group of transmitting radio frequency channels; and To perform interpolation according to the channel information corresponding to the sub-carriers to which the intra-group transmission calibration pilot sequences are mapped over each group of transmitting radio frequency channels, to obtain channel information corresponding to all the sub-carriers over each group of transmitting radio frequency channels.

In an implementation, the first processing unit 702 is configured:

To map the intra-group transmission calibration pilot sequences corresponding respectively to the respective groups of transmitting radio frequency channels onto the sub-carriers in the entire operating bandwidth of the transmitting radio frequency channels, where the spacing between the sub-carriers to which the respective transmitting radio frequency channels are mapped is a third sub-carrier offset which is more than or equal to the number of channels in a group of transmitting radio frequency channels, and the spacing between sub-carriers to which two adjacent transmitting radio frequency channels are mapped is a fourth sub-carrier offset which is less than the third sub-carrier offset.

In an implementation, the transmission timeslots are guard timeslots; and a first transmission timeslot in which the intra-group transmission calibration pilot sequences are transmitted in a first group of transmitting radio frequency channels, and a second transmission timeslot in which the intra-group transmission calibration pilot sequences are transmitted in a second group of transmitting radio frequency channels are two adjacent guard timeslots, or the first transmission timeslot is spaced from the second transmission timeslot by X guard timeslots, where the first group of transmitting radio frequency channels, and the second group of transmitting radio frequency channels are any two groups of transmitting radio frequency channels with adjacent transmission timeslots of their intra-group transmission calibration pilot sequences, and X is an integer more than or equal to 1.

As can be apparent from the disclosure above, the transmitting radio frequency channels in the array of antenna are grouped into M groups, and the intra-group transmission calibration pilot sequences of the corresponding groups are transmitted respectively in the transmission timeslots corresponding respectively to the respective groups of transmitting radio frequency channels, where the transmission timeslots of the intra-group transmission calibration pilot sequences corresponding to the different groups are different from each other, that is, for the M groups transmitting radio frequency channels, the intra-group transmission calibration pilot sequences of the respective groups of transmitting radio frequency channels are transmitted in the different transmission timeslots in the time division mode, so channel estimation can be performed separately on each group of transmitting radio frequency channels, and if channel estimation is performed on each group of transmitting radio frequency channels in the frequency division mode, then simply the intra-group transmission calibration pilot sequences will be transmitted over different frequency resources in respective transmitting radio frequency channels in a group, that is, for each group of transmitting radio frequency channels, intra-group transmission calibration pilot sequences corresponding to each group can be mapped into the group of transmitting radio frequency channels in the frequency division mode, so there are such a smaller number of transmitting radio frequency channels in each group that longer intra-group transmission calibration pilot sequences can be mapped onto the respective radio frequency channels in the group in the frequency division mode; and furthermore there is an increase in the length of the intra-group transmission calibration pilot sequences for channel estimation mapped onto the respective radio frequency channels, the precision of the determined inter-channel compensation coefficients of the respective transmitting radio frequency channels can be improved.

Figure 8:
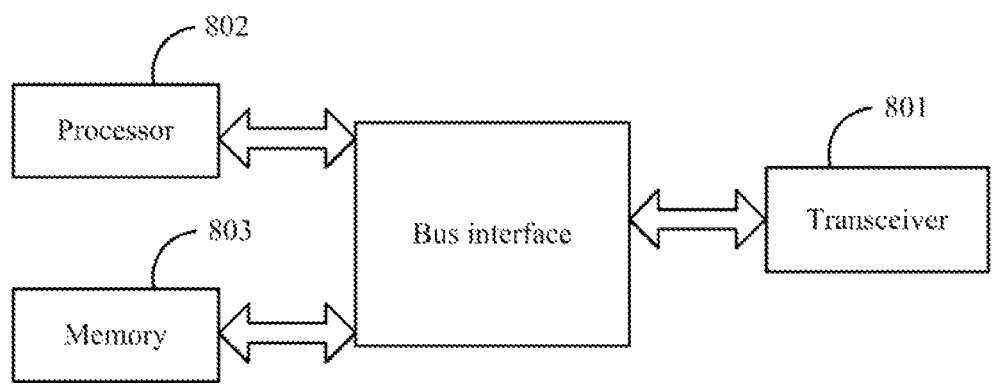
FIG. 8 is a schematic structural diagram of another apparatus for calibrating an antenna according to an embodiment of the invention.

FIG. 8 illustrates a schematic structural diagram of an apparatus for calibrating an antenna.

Based upon the same idea, an embodiment of the invention further provides an apparatus for calibrating an antenna as illustrated in FIG. 7, which includes a transceiver 801, a processor 802, and a memory 803, where:

The processor 802 is configured to read and execute program in the memory 803:

To obtain information about grouping of transmitting radio frequency channels, where the transmitting radio frequency channels in an array of antennas are grouped into M groups, and M is an integer more than 1;

To transmit intra-group transmission calibration pilot sequences corresponding respectively to the respective groups of transmitting radio frequency channels over the corresponding groups of transmitting radio frequency channels respectively in transmission timeslots of the intra-group transmission calibration pilot sequences, and to perform channel estimation on the respective groups of transmitting radio frequency channels according to feedback signals of the intra-group transmission calibration pilot sequences received over a calibration receiving channel to obtain channel information of the M groups of transmitting radio frequency channels, where there are different transmission timeslots of intra-group transmission calibration pilot sequences corresponding to different groups; and To determine inter-channel compensation coefficients of the respective transmitting radio frequency channels according to the channel information of the M groups of transmitting radio frequency channels.

The transceiver 801 can include a baseband processing component, a radio frequency processing component, and other components as needed in practice, and is configured to transmit the intra-group transmission calibration pilot sequences over the transmitting radio frequency channels in the respective groups, and to receive the feedback signals of the intra-group transmission calibration pilot sequences over the calibration receiving channel.

In an implementation, each group of transmitting radio frequency channels includes N transmitting radio frequency channels, where N is 1, or N is an integer more than 1. If N is an integer more than 1, then intra-group transmission calibration pilot sequences will be transmitted over different frequency resources in respective transmitting radio frequency channels in a group.

In an implementation, the processor 802 is configured:
To select a reference channel from each group of transmitting radio frequency channels respectively according to the channel information of each group of transmitting radio frequency channels to obtain M reference channels;

To transmit inter-group transmission calibration pilot sequences over the M reference channels, and to perform channel estimation on the M reference channels according to feedback signals of the inter-group transmission calibration pilot sequences received over the calibration receiving channel to obtain channel information of the M reference channels; and To revise the channel information of the group of transmitting radio frequency channels corresponding to each reference channel respectively according to the channel information of each reference channel; and to determine the inter-channel compensation coefficient of each transmitting radio frequency channel according to the revised channel information of each group of transmitting radio frequency channels.

In an implementation, the processor 802 is configured:
For each group of transmitting radio frequency channels,
To determine receive power of each transmitting radio frequency channel in the group of transmitting radio frequency channels; and To determine transmitting radio frequency channels with their receive power being not below a first threshold as active transmitting radio frequency channels, and to select a reference channel from all the active transmitting radio frequency channels in the group of transmitting radio frequency channels according to the receive power of all the active transmitting radio frequency channels in the group of transmitting radio frequency channels.

The processor 802 is configured:
To map the inter-group transmission calibration pilot sequences onto the sub-carriers in the entire operating bandwidth of each reference channel, where the spacing between sub-carriers to which each reference channel is mapped is a first sub-carrier offset more than or equal to M, and the spacing between sub-carriers to which two adjacent reference channels are mapped is a second sub-carrier offset less than the first sub-carrier offset.

In an implementation, the processor 802 is configured:
To transmit the inter-group transmission calibration pilot sequences over the M reference channels in a transmission timeslot of the inter-group transmission calibration pilot sequences in the current calibration period, where the inter-group transmission calibration pilot sequences are transmitted over different frequency resources of the M reference channels.

In an implementation, the processor 802 is configured:
To perform channel estimation on the M reference channels according to the feedback signals of the inter-group transmission calibration pilot sequences received over the calibration receiving channel, to obtain channel information corresponding to the sub-carriers to which the inter-group transmission calibration pilot sequences are mapped over each reference channel; and To perform interpolation according to the channel information corresponding to the sub-carriers to which the inter-group transmission calibration pilot sequences are mapped over each reference channel, to obtain channel information corresponding to all the sub-carriers over each reference channel.

In an implementation, the processor 802 is configured:
For each group of transmitting radio frequency channels,
To calculate a ratio of channel information obtained based upon the inter-group transmission calibration pilot sequences, to channel information based upon the intra-group transmission calibration pilot sequences, of the reference channel of the group of transmitting radio frequency channels as a revision coefficient corresponding to the group of transmitting radio frequency channels; and To calculate a product of the revision coefficient corresponding to the group of transmitting radio frequency channels, and the channel information of each transmitting radio frequency channel in the group of transmitting radio frequency channels obtained based upon the intra-group transmission calibration pilot sequences as revised channel information of each transmitting radio frequency channel in the group of transmitting radio frequency channels.

In an implementation, the processor 802 is configured:
To perform channel estimation on each group of transmitting radio frequency channels according to the feedback signals of the intra-group transmission calibration pilot sequences received over the calibration receiving channel, to obtain channel information corresponding to the sub-carriers to which the intra-group transmission calibration pilot sequences are mapped over each group of transmitting radio frequency channels; and To perform interpolation according to the channel information corresponding to the sub-carriers to which the intra-group transmission calibration pilot sequences are mapped over each group of transmitting radio frequency channels, to obtain channel information corresponding to all the sub-carriers over each group of transmitting radio frequency channels.

In an implementation, the processor 802 is configured:
To map the intra-group transmission calibration pilot sequences corresponding respectively to the respective groups of transmitting radio frequency channels onto the sub-carriers in the entire operating bandwidth of the transmitting radio frequency channels, where the spacing between the sub-carriers to which the respective transmitting radio frequency channels are mapped is a third sub-carrier offset which is more than or equal to the number of channels in a group of transmitting radio frequency channels, and the spacing between sub-carriers to which two adjacent transmitting radio frequency channels are mapped is a fourth sub-carrier offset which is less than the third sub-carrier offset.

In an implementation, the transmission timeslots are guard timeslots; and a first transmission timeslot in which the intra-group transmission calibration pilot sequences are transmitted in a first group of transmitting radio frequency channels, and a second transmission timeslot in which the intra-group transmission calibration pilot sequences are transmitted in a second group of transmitting radio frequency channels are two adjacent guard timeslots, or the first transmission timeslot is spaced from the second transmission timeslot by X guard timeslots, where the first group of transmitting radio frequency channels, and the second group of transmitting radio frequency channels are any two groups of transmitting radio frequency channels with adjacent transmission timeslots of their intra-group transmission calibration pilot sequences, and X is an integer more than or equal to 1.

Here in FIG. 8, the bus architecture can include any number of interconnecting buses and bridges to particularly link together various circuits including one or more processors represented by the processor 802, and one or more memories represented by the memory 803. The bus architecture can further link together various other circuits, e.g., prophetical devices, manostats, power management circuits, etc., all of which are well known in the art, so a further description thereof will be omitted in this context. The bus interface serves as an interface. The transceiver 801 can be a number of elements including a transmitter and a receiver which are units for communication with various other devices over a transmission medium. The processor 802 is responsible for managing the bus architecture and performing normal processes, and the memory 803 can store data for use by the processor 802 in performing the operations.

As can be apparent from the disclosure above, the transmitting radio frequency channels in the array of antenna are grouped into M groups, and the intra-group transmission calibration pilot sequences of the corresponding groups are transmitted respectively in the transmission timeslots corresponding respectively to the respective groups of transmitting radio frequency channels, where the transmission timeslots of the intra-group transmission calibration pilot sequences corresponding to the different groups are different from each other, that is, for the M groups transmitting radio frequency channels, the intra-group transmission calibration pilot sequences of the respective groups of transmitting radio frequency channels are transmitted in the different transmission timeslots in the time division mode, so channel estimation can be performed separately on each group of transmitting radio frequency channels, and if channel estimation is performed on each group of transmitting radio frequency channels in the frequency division mode, then simply the intra-group transmission calibration pilot sequences will be transmitted over different frequency resources in respective transmitting radio frequency channels in a group, that is, for each group of transmitting radio frequency channels, intra-group transmission calibration pilot sequences corresponding to each group can be mapped into the group of transmitting radio frequency channels in the frequency division mode, so there are such a smaller number of transmitting radio frequency channels in each group that longer intra-group transmission calibration pilot sequences can be mapped onto the respective radio frequency channels in the group in the frequency division mode; and furthermore there is an increase in the length of the intra-group transmission calibration pilot sequences for channel estimation mapped onto the respective radio frequency channels, the precision of the determined inter-channel compensation coefficients of the respective transmitting radio frequency channels can be improved.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for calibrating an antenna, the method comprising the operations of:

obtaining information about grouping of transmitting radio frequency channels, wherein the transmitting radio frequency channels in an array of antennas are grouped into M groups, and M is an integer more than 1;

transmitting intra-group transmission calibration pilot sequences corresponding respectively to the respective groups of transmitting radio frequency channels over the corresponding groups of transmitting radio frequency channels respectively in transmission timeslots of the intra-group transmission calibration pilot sequences, and performing channel estimation on the respective groups of transmitting radio frequency channels according to feedback signals of the intra-group transmission calibration pilot sequences received over a calibration receiving channel to obtain channel information of the M groups of transmitting radio frequency channels, wherein there are different transmission timeslots of intra-group transmission calibration pilot sequences corresponding to different groups; and determining inter-channel compensation coefficients of the respective transmitting radio frequency channels according to the channel information of the M groups of transmitting radio frequency channels.

2. The method according to claim 1, wherein each group of transmitting radio frequency channels comprises N transmitting radio frequency channels, wherein:

N is 1; or N is an integer more than 1, and intra-group transmission calibration pilot sequences are transmitted over different frequency resources in respective transmitting radio frequency channels in a group.

3. The method according to claim 1, wherein the determining the inter-channel compensation coefficients of the respective transmitting radio frequency channels according to the channel information of the M groups of transmitting radio frequency channels comprises:

selecting a reference channel from each group of transmitting radio frequency channels respectively according to the channel information of each group of transmitting radio frequency channels to obtain M reference channels;

transmitting inter-group transmission calibration pilot sequences over the M reference channels, and performing channel estimation on the M reference channels according to feedback signals of the inter-group transmission calibration pilot sequences received over the calibration receiving channel to obtain channel information of the M reference channels;

revising the channel information of the group of transmitting radio frequency channels corresponding to each reference channel respectively according to the channel information of each reference channel; and determining the inter-channel compensation coefficient of each transmitting radio frequency channel according to the revised channel information of each group of transmitting radio frequency channels.

4. The method according to claim 3, wherein the selecting a reference channel from each group of transmitting radio frequency channels respectively according to the channel information of each group of transmitting radio frequency channels comprises:

for each group of transmitting radio frequency channels, determining receive power of each transmitting radio frequency channel in the group of transmitting radio frequency channels; and determining transmitting radio frequency channels with their receive power being not below a first threshold as active transmitting radio frequency channels, and selecting a reference channel from all the active transmitting radio frequency channels in the group of transmitting radio frequency channels according to the receive power of all the active transmitting radio frequency channels in the group of transmitting radio frequency channels.

5. The method according to claim 3, wherein the transmitting the inter-group transmission calibration pilot sequences over the M reference channels comprises:

mapping the inter-group transmission calibration pilot sequences onto the sub-carriers in the entire operating bandwidth of each reference channel, wherein the spacing between sub-carriers to which each reference channel is mapped is a first sub-carrier offset more than or equal to M, and the spacing between sub-carriers to which two adjacent reference channels are mapped is a second sub-carrier offset less than the first sub-carrier offset; or transmitting the inter-group transmission calibration pilot sequences over the M reference channels in a transmission timeslot of the inter-group transmission calibration pilot sequences in the current calibration period, wherein the inter-group transmission calibration pilot sequences are transmitted over different frequency resources of the M reference channels.

6. The method according to claim 3, wherein the performing channel estimation on the M reference channels according to the feedback signals of the inter-group transmission calibration pilot sequences received over the calibration receiving channel comprises:

performing channel estimation on the M reference channels according to the feedback signals of the inter-group transmission calibration pilot sequences received over the calibration receiving channel, to obtain channel information corresponding to the sub-carriers to which the inter-group transmission calibration pilot sequences are mapped over each reference channel; and performing interpolation according to the channel information corresponding to the sub-carriers to which the inter-group transmission calibration pilot sequences are mapped over each reference channel, to obtain channel information corresponding to all the sub-carriers over each reference channel.

7. The method according to claim 3, wherein the revising the channel information of the group of transmitting radio frequency channels corresponding to each reference channel respectively according to the channel information of each reference channel comprises:

for each group of transmitting radio frequency channels, calculating a ratio of channel information obtained based upon the inter-group transmission calibration pilot sequences, to channel information based upon the intra-group transmission calibration pilot sequences, of the reference channel of the group of transmitting radio frequency channels as a revision coefficient corresponding to the group of transmitting radio frequency channels; and calculating a product of the revision coefficient corresponding to the group of transmitting radio frequency channels, and the channel information of each transmitting radio frequency channel in the group of transmitting radio frequency channels obtained based upon the intra-group transmission calibration pilot sequences as revised channel information of each transmitting radio frequency channel in the group of transmitting radio frequency channels.

8. The method according to claim 1, wherein the performing channel estimation on the respective groups of transmitting radio frequency channels according to the feedback signals of the intra-group transmission calibration pilot sequences received over the calibration receiving channel to obtain the channel information of the M groups of transmitting radio frequency channels comprises:

performing channel estimation on each group of transmitting radio frequency channels according to the feedback signals of the intra-group transmission calibration pilot sequences received over the calibration receiving channel, to obtain channel information corresponding to the sub-carriers to which the intra-group transmission calibration pilot sequences are mapped over each group of transmitting radio frequency channels; and performing interpolation according to the channel information corresponding to the sub-carriers to which the intra-group transmission calibration pilot sequences are mapped over each group of transmitting radio frequency channels, to obtain channel information corresponding to all the sub-carriers over each group of transmitting radio frequency channels.

9. The method according to claim 1, wherein the transmitting the intra-group transmission calibration pilot sequences over the corresponding groups of transmitting radio frequency channels comprises:

mapping the intra-group transmission calibration pilot sequences corresponding respectively to the respective groups of transmitting radio frequency channels onto the sub-carriers in the entire operating bandwidth of the transmitting radio frequency channels, wherein the spacing between the sub-carriers to which the respective transmitting radio frequency channels are mapped is a third sub-carrier offset which is more than or equal to the number of channels in a group of transmitting radio frequency channels, and the spacing between sub-carriers to which two adjacent transmitting radio frequency channels are mapped is a fourth sub-carrier offset which is less than the third sub-carrier offset.

10. The method according to claim 1, wherein the transmission timeslots are guard timeslots; and a first transmission timeslot in which the intra-group transmission calibration pilot sequences are transmitted in a first group of transmitting radio frequency channels, and a second transmission timeslot in which the intra-group transmission calibration pilot sequences are transmitted in a second group of transmitting radio frequency channels are two adjacent guard timeslots, or the first transmission timeslot is spaced from the second transmission timeslot by X guard timeslots, wherein the first group of transmitting radio frequency channels, and the second group of transmitting radio frequency channels are any two groups of transmitting radio frequency channels with adjacent transmission timeslots of their intra-group transmission calibration pilot sequences, and X is an integer more than or equal to 1.

11. An apparatus for calibrating an antenna, the apparatus comprising a transceiver, a processor, and a memory, wherein the processor is configured to read and execute program in the memory:

to obtain information about grouping of transmitting radio frequency channels, wherein the transmitting radio frequency channels in an array of antennas are grouped into M groups, and M is an integer more than 1;

to transmit intra-group transmission calibration pilot sequences corresponding respectively to the respective groups of transmitting radio frequency channels over the corresponding groups of transmitting radio frequency channels respectively in transmission timeslots of the intra-group transmission calibration pilot sequences, and to perform channel estimation on the respective groups of transmitting radio frequency channels according to feedback signals of the intra-group transmission calibration pilot sequences received over a calibration receiving channel to obtain channel information of the M groups of transmitting radio frequency channels, wherein there are different transmission timeslots of intra-group transmission calibration pilot sequences corresponding to different groups; and to determine inter-channel compensation coefficients of the respective transmitting radio frequency channels according to the channel information of the M groups of transmitting radio frequency channels.

12. The apparatus according to claim 11, wherein each group of transmitting radio frequency channels comprises N transmitting radio frequency channels, wherein:

N is 1; or N is an integer more than 1, and intra-group transmission calibration pilot sequences are transmitted over different frequency resources in respective transmitting radio frequency channels in a group.

13. The apparatus according to claim 11, wherein the processor is configured to select a reference channel from each group of transmitting radio frequency channels respectively according to the channel information of each group of transmitting radio frequency channels to obtain M reference channels;

to transmit inter-group transmission calibration pilot sequences over the M reference channels, and to perform channel estimation on the M reference channels according to feedback signals of the inter-group transmission calibration pilot sequences received over the calibration receiving channel to obtain channel information of the M reference channels; and to revise the channel information of the group of transmitting radio frequency channels corresponding to each reference channel respectively according to the channel information of each reference channel; and to determine the inter-channel compensation coefficient of each transmitting radio frequency channel according to the revised channel information of each group of transmitting radio frequency channels.

14. The apparatus according to claim 13, wherein the processor is further configured:

for each group of transmitting radio frequency channels,
to determine receive power of each transmitting radio frequency channel in the group of transmitting radio frequency channels; and
to determine transmitting radio frequency channels with their receive power being not below a first threshold as active transmitting radio frequency channels, and to select a reference channel from all the active transmitting radio frequency channels in the group of transmitting radio frequency channels according to the receive power of all the active transmitting radio frequency channels in the group of transmitting radio frequency channels.

15. The apparatus according to claim 13, wherein the processor is further configured to map the inter-group transmission calibration pilot sequences onto the sub-carriers in the entire operating bandwidth of each reference channel, wherein the spacing between sub-carriers to which each reference channel is mapped is a first sub-carrier offset more than or equal to M, and the spacing between sub-carriers to which two adjacent reference channels are mapped is a second sub-carrier offset less than the first sub-carrier offset; or to transmit the inter-group transmission calibration pilot sequences over the M reference channels in a transmission timeslot of the inter-group transmission calibration pilot sequences in the current calibration period, wherein the inter-group transmission calibration pilot sequences are transmitted over different frequency resources of the M reference channels.

16. The apparatus according to claim 13, wherein the processor is further configured: to perform channel estimation on the M reference channels according to the feedback signals of the inter-group transmission calibration pilot sequences received over the calibration receiving channel, to obtain channel information corresponding to the sub-carriers to which the inter-group transmission calibration pilot sequences are mapped over each reference channel; and to perform interpolation according to the channel information corresponding to the sub-carriers to which the inter-group transmission calibration pilot sequences are mapped over each reference channel, to obtain channel information corresponding to all the sub-carriers over each reference channel.

17. The apparatus according to claim 13, wherein the processor is further configured:
  for each group of transmitting radio frequency channels,
    to calculate a ratio of channel information obtained based upon the inter-group transmission calibration pilot sequences, to channel information based upon the intra-group transmission calibration pilot sequences, of the reference channel of the group of transmitting radio frequency channels as a revision coefficient corresponding to the group of transmitting radio frequency channels; and
    to calculate a product of the revision coefficient corresponding to the group of transmitting radio frequency channels, and the channel information of each transmitting radio frequency channel in the group of transmitting radio frequency channels obtained based upon the intra-group transmission calibration pilot sequences as revised channel information of each transmitting radio frequency channel in the group of transmitting radio frequency channels.

18. The apparatus according to claim 11, wherein the processor is further configured: to perform channel estimation on each group of transmitting radio frequency channels according to the feedback signals of the intra-group transmission calibration pilot sequences received over the calibration receiving channel, to obtain channel information corresponding to the sub-carriers to which the intra-group transmission calibration pilot sequences are mapped over each group of transmitting radio frequency channels; and to perform interpolation according to the channel information corresponding to the sub-carriers to which the intra-group transmission calibration pilot sequences are mapped over each group of transmitting radio frequency channels, to obtain channel information corresponding to all the sub-carriers over each group of transmitting radio frequency channels.

19. The apparatus according to claim 11, wherein the processor is further configured to map the intra-group transmission calibration pilot sequences corresponding respectively to the respective groups of transmitting radio frequency channels onto the sub-carriers in the entire operating bandwidth of the transmitting radio frequency channels, wherein the spacing between the sub-carriers to which the respective transmitting radio frequency channels are mapped is a third sub-carrier offset which is more than or equal to the number of channels in a group of transmitting radio frequency channels, and the spacing between sub-carriers to which two adjacent transmitting radio frequency channels are mapped is a fourth sub-carrier offset which is less than the third sub-carrier offset.

20. The apparatus according to claim 11, wherein the transmission timeslots are guard timeslots; and a first transmission timeslot in which the intra-group transmission calibration pilot sequences are transmitted in a first group of transmitting radio frequency channels, and a second transmission timeslot in which the intra-group transmission calibration pilot sequences are transmitted in a second group of transmitting radio frequency channels are two adjacent guard timeslots, or the first transmission timeslot is spaced from the second transmission timeslot by X guard timeslots, wherein the first group of transmitting radio frequency channels, and the second group of transmitting radio frequency channels are any two groups of transmitting radio frequency channels with adjacent transmission timeslots of their intra-group transmission calibration pilot sequences, and X is an integer more than or equal to 1.

* * * * *